(12) United States Patent
Conners et al.

(10) Patent No.: US 10,731,556 B2
(45) Date of Patent: Aug. 4, 2020

(54) ISENTROPIC COMPRESSION INLET FOR SUPERSONIC AIRCRAFT

(71) Applicant: Gulfstream Aerospace Corporation, Savannah, GA (US)

(72) Inventors: Timothy R. Conners, Tucson, AZ (US); Preston A. Henne, Savannah, GA (US); Donald C. Howe, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 988 days.

(21) Appl. No.: 15/164,557

(22) Filed: May 25, 2016

(65) Prior Publication Data

US 2016/0265433 A1    Sep. 15, 2016

Related U.S. Application Data

(60) Division of application No. 13/629,181, filed on Sep. 27, 2012, now Pat. No. 9,482,155, which is a
(Continued)

(51) Int. Cl.
*F02C 7/04* (2006.01)
*B64C 30/00* (2006.01)
(Continued)

(52) U.S. Cl.
CPC ............... *F02C 7/04* (2013.01); *B64C 30/00* (2013.01); *B64D 27/16* (2013.01); *B64D 29/00* (2013.01); *B64D 33/02* (2013.01); *F02C 7/042* (2013.01); *F02K 7/10* (2013.01); *B64D 2033/026* (2013.01); *F05D 2210/33* (2013.01);
(Continued)

(58) Field of Classification Search
CPC .......... F02C 7/04; F02K 7/10; F05D 2220/80; B64C 30/00; B64D 2033/026
See application file for complete search history.

(56) References Cited

U.S. PATENT DOCUMENTS

| 2,916,230 A | 12/1959 | Nial |
| 7,837,142 B2 * | 11/2010 | Chase ..................... B64C 30/00 244/110 B |

(Continued)

OTHER PUBLICATIONS

Zha, Ge-Cheng et al., "High-Performance Supersonic Missile Inlet Design Using Automated Optimization", Journal of Aircraft, vol. 34, No. 6, Nov.-Dec. 1997, pp. 697-705. (Year: 1997).*
(Continued)

*Primary Examiner* — Lorne E Meade
(74) *Attorney, Agent, or Firm* — LKGlobal | Lorenz & Kopf, LLP

(57) ABSTRACT

A supersonic inlet includes a relaxed isentropic compression surface to improve net propulsive force by shaping the compression surface of the inlet to defocus the resulting shocklets away from the cowl lip. Relaxed isentropic compression shaping of the inlet compression surface functions to reduce the cowl lip surface angle, thereby improving inlet drag characteristics and interference drag characteristics. Supersonic inlets in accordance with the invention also demonstrate reductions in peak sonic boom overpressure while maintaining overall engine performance.

2 Claims, 18 Drawing Sheets

Related U.S. Application Data continuation of application No. 11/639,339, filed on Dec. 15, 2006, now Pat. No. 8,333,076.

(60) Provisional application No. 60/750,345, filed on Dec. 15, 2005.

(51) Int. Cl.
*F02K 7/10* (2006.01)
*B64D 33/02* (2006.01)
*F02C 7/042* (2006.01)
*B64D 27/16* (2006.01)
*B64D 29/00* (2006.01)

(52) U.S. Cl.
CPC ...... *F05D 2220/80* (2013.01); *F05D 2250/70* (2013.01); *Y10T 29/49323* (2015.01); *Y10T 137/0318* (2015.04); *Y10T 137/0536* (2015.04)

(56) References Cited

U.S. PATENT DOCUMENTS

| | | | | |
|---|---|---|---|---|
| 8,286,434 B2* | 10/2012 | Henne | ............ | B64D 33/02 60/767 |
| 8,327,645 B2* | 12/2012 | Henne | ............ | B64D 33/02 60/767 |
| 8,333,076 B2* | 12/2012 | Conners | ............ | B64D 33/02 60/767 |
| 9,482,155 B2* | 11/2016 | Conners | ............ | B64D 33/02 |
| 2011/0000548 A1* | 1/2011 | Sanders | ............ | B64D 33/02 137/1 |

OTHER PUBLICATIONS

European Patent Office, Communication pursuant to Article 94(3) EPC for Application No. 06 851 790.3-1607 dated Mar. 28, 2017.

* cited by examiner

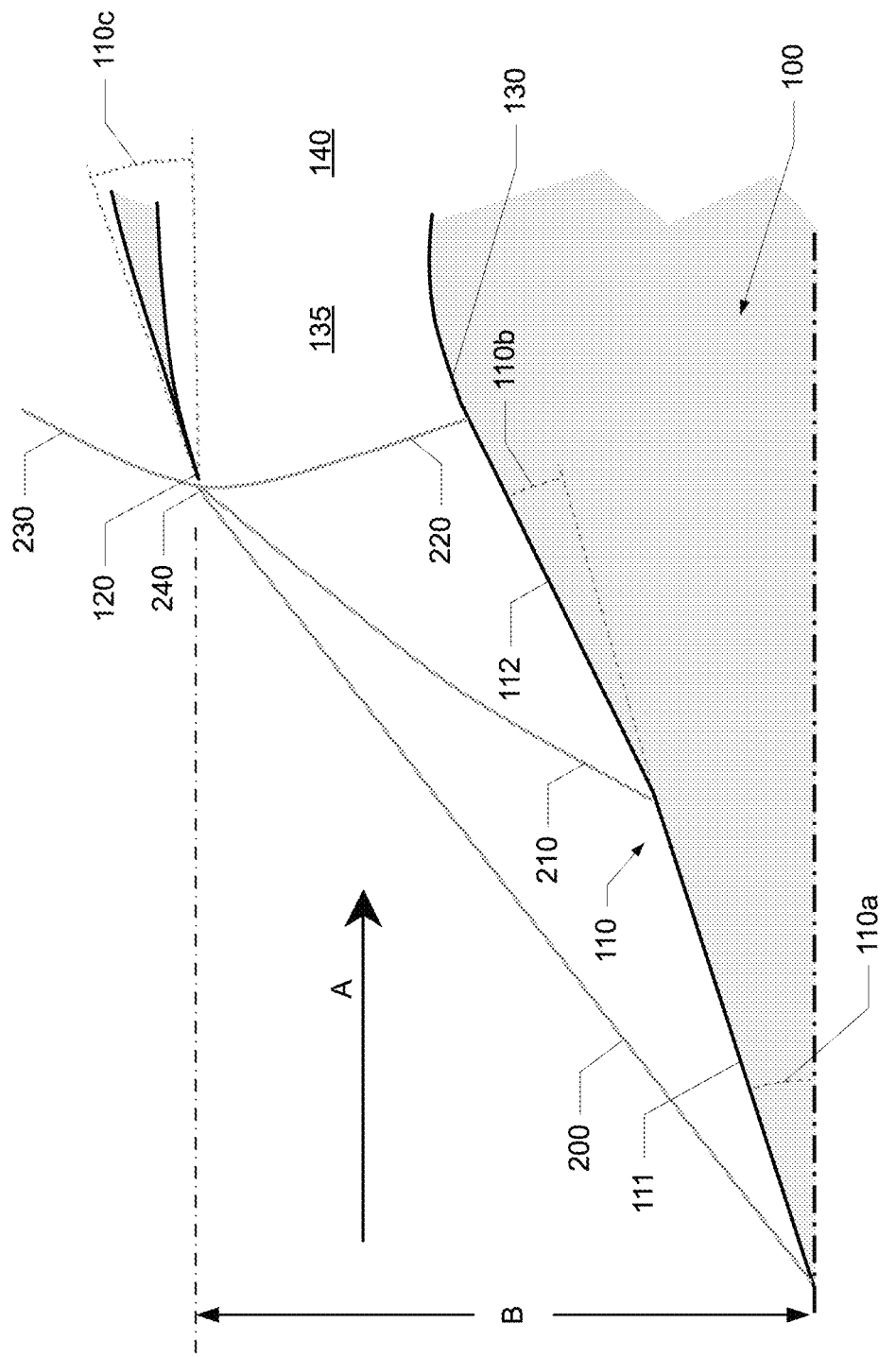
Figure 1-A
(Prior Art)

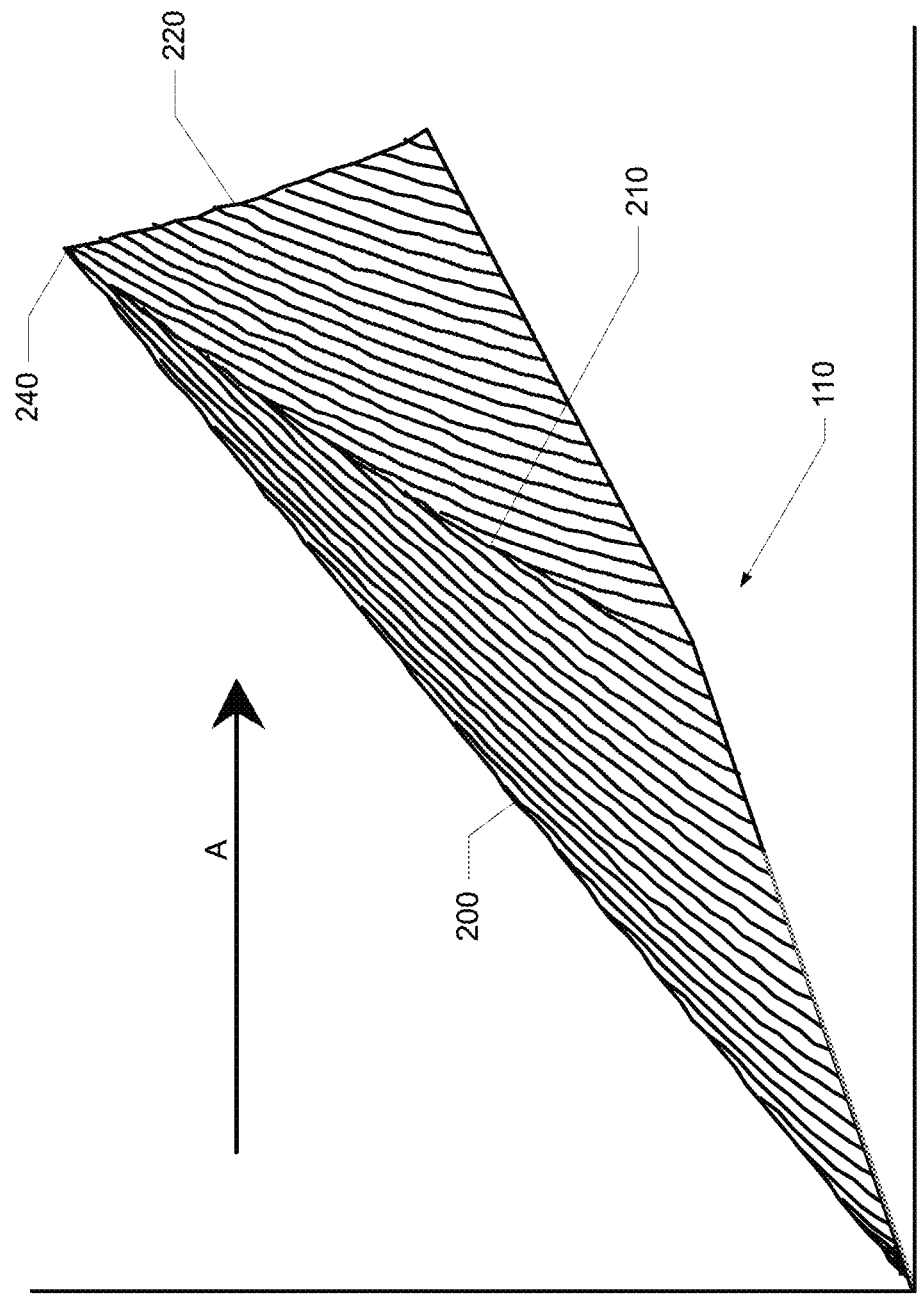
Figure 1-B
(Prior Art)

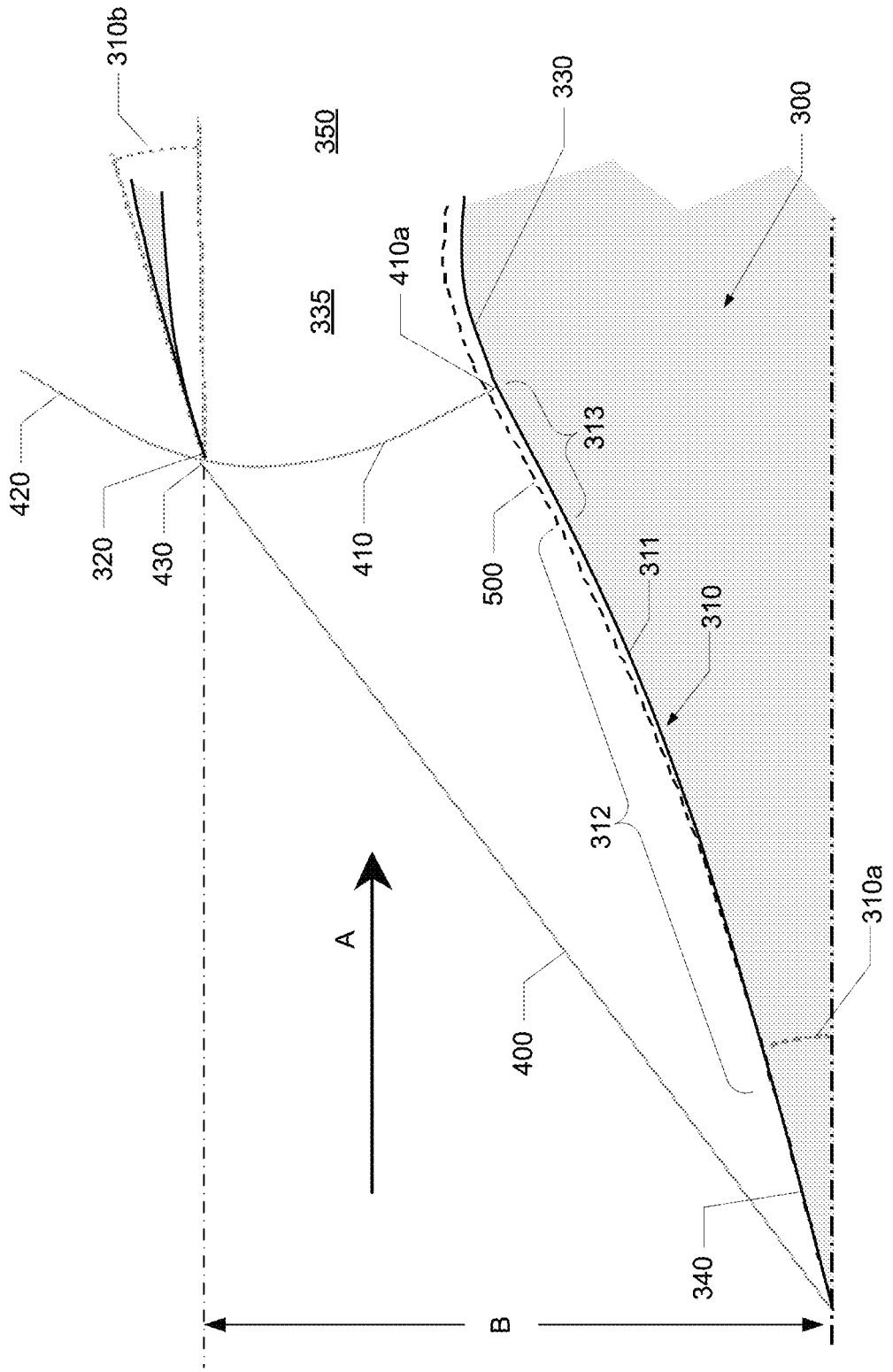
Figure 2-A

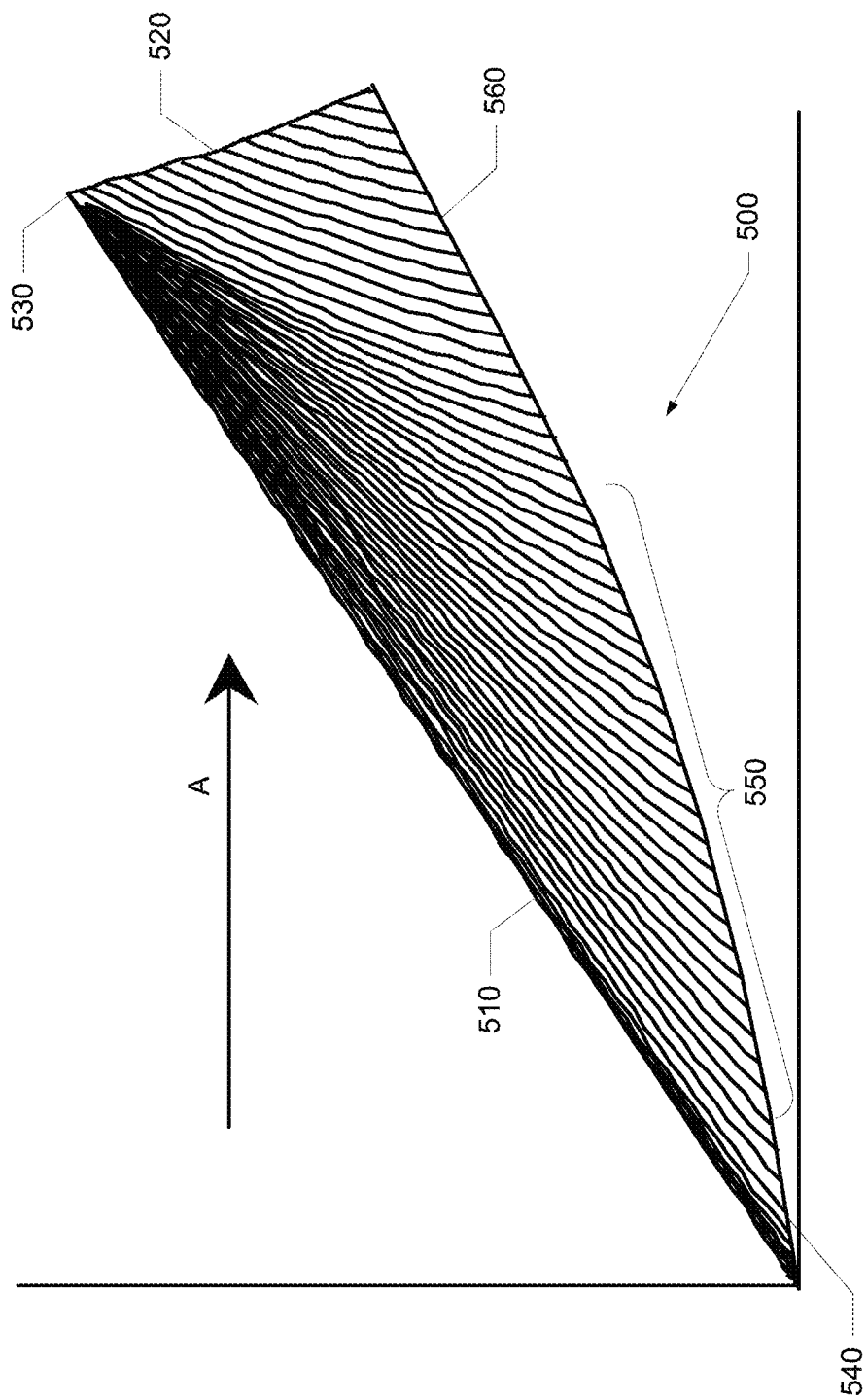
Figure 2-B
(Prior Art)

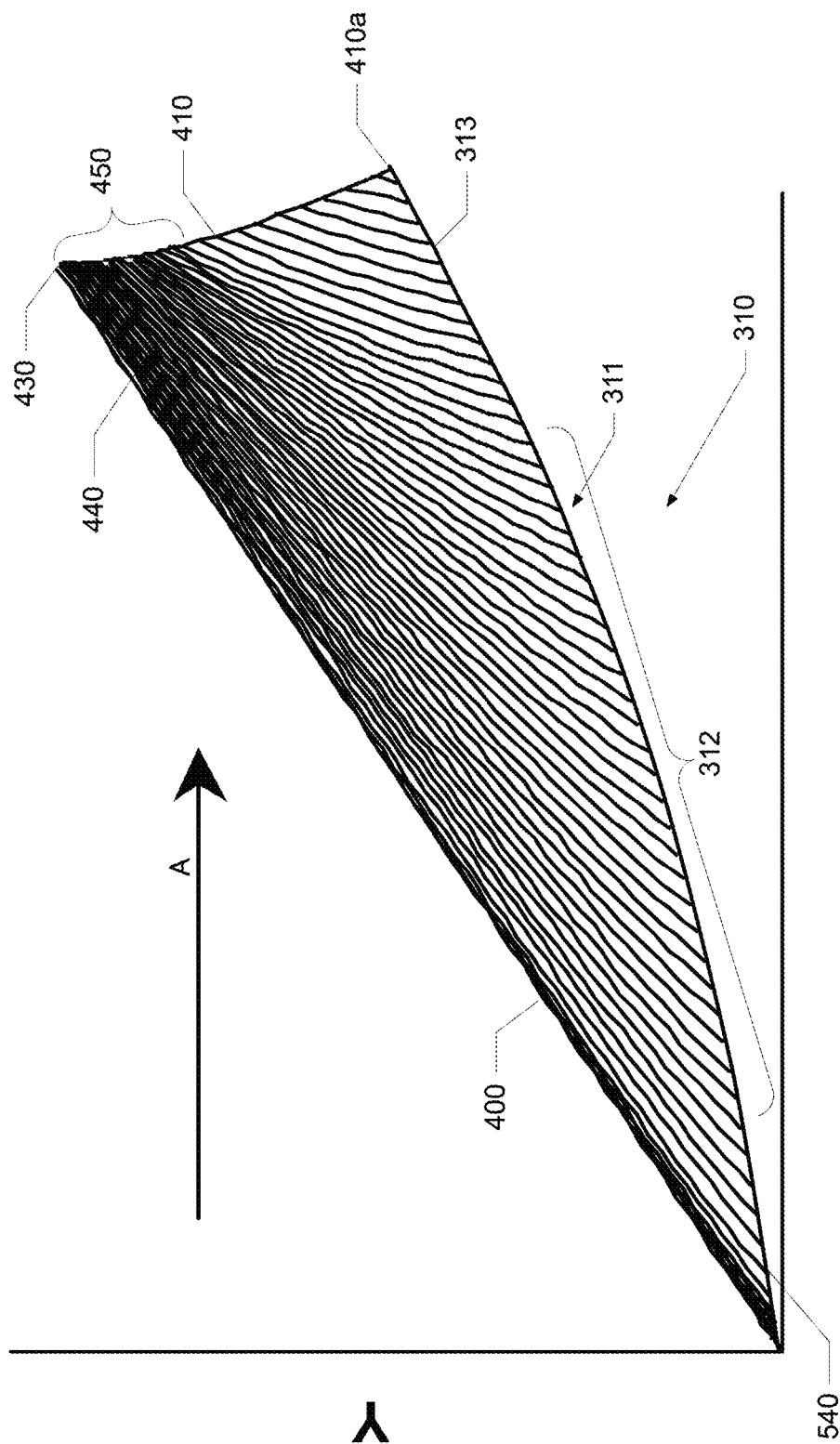
Figure 2-C

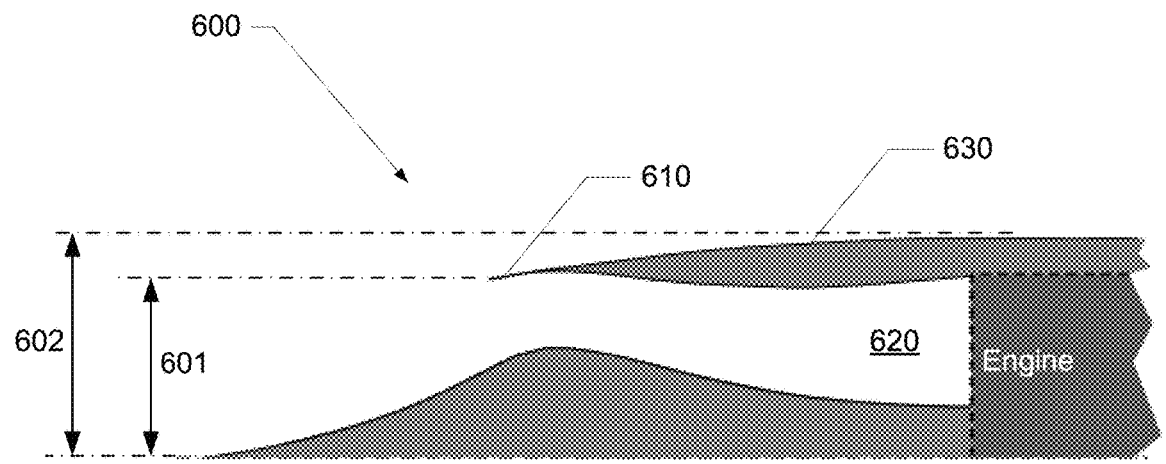
Figure 3-A
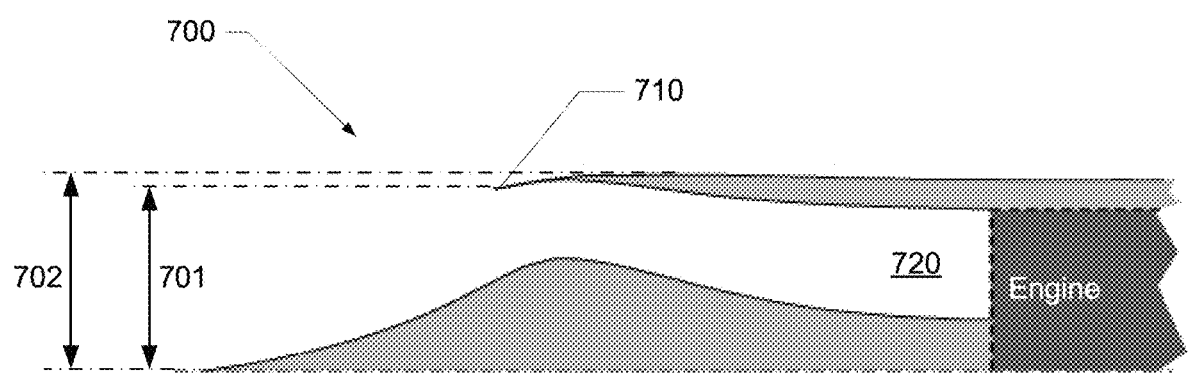
Figure 3-B

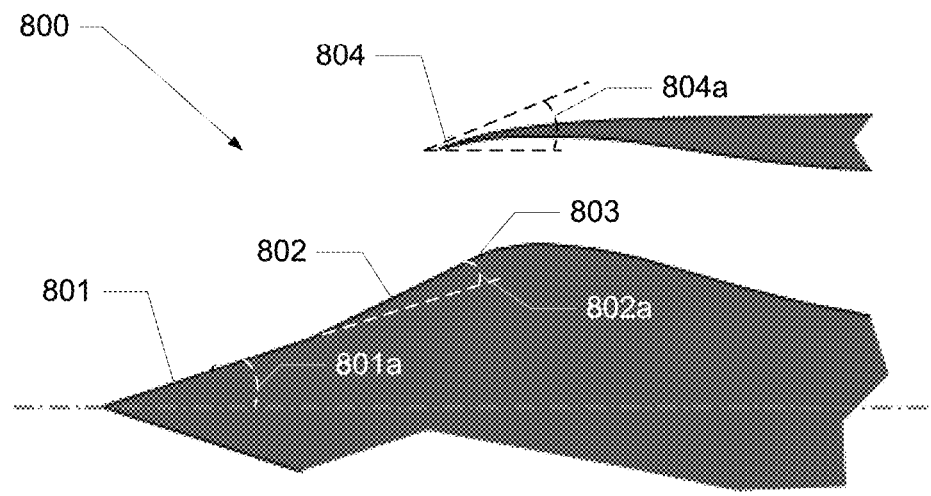
Figure 4-A
(Prior Art)
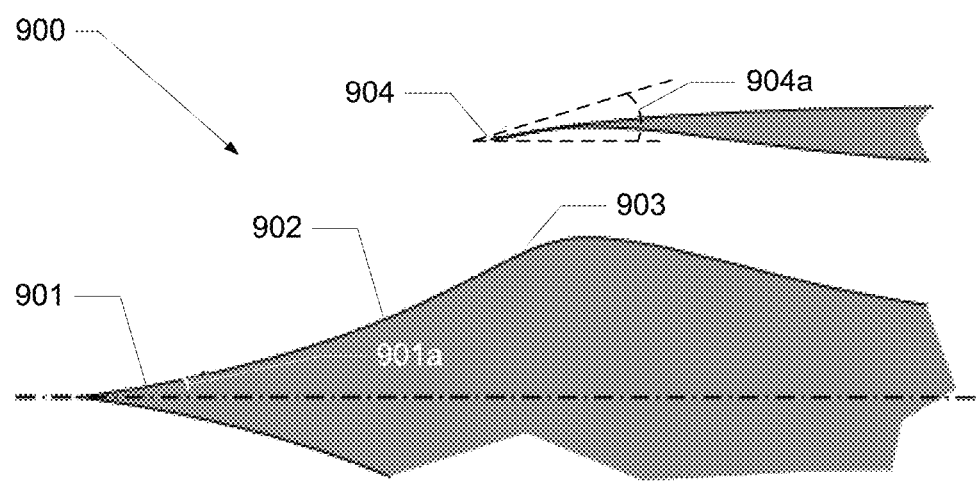
Figure 4-B

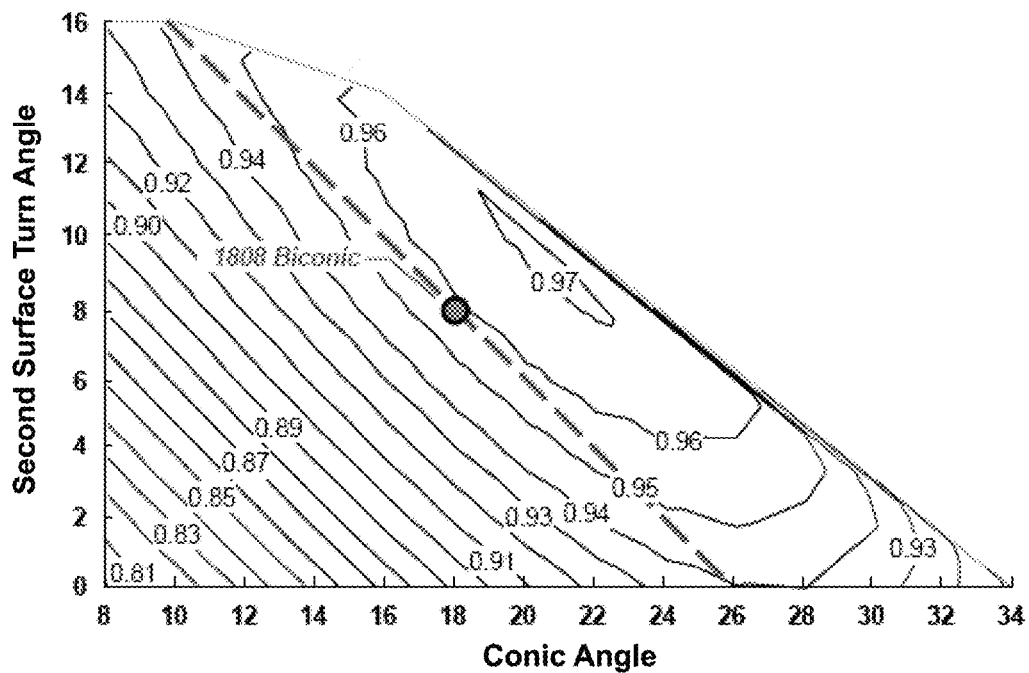
Figure 5-A
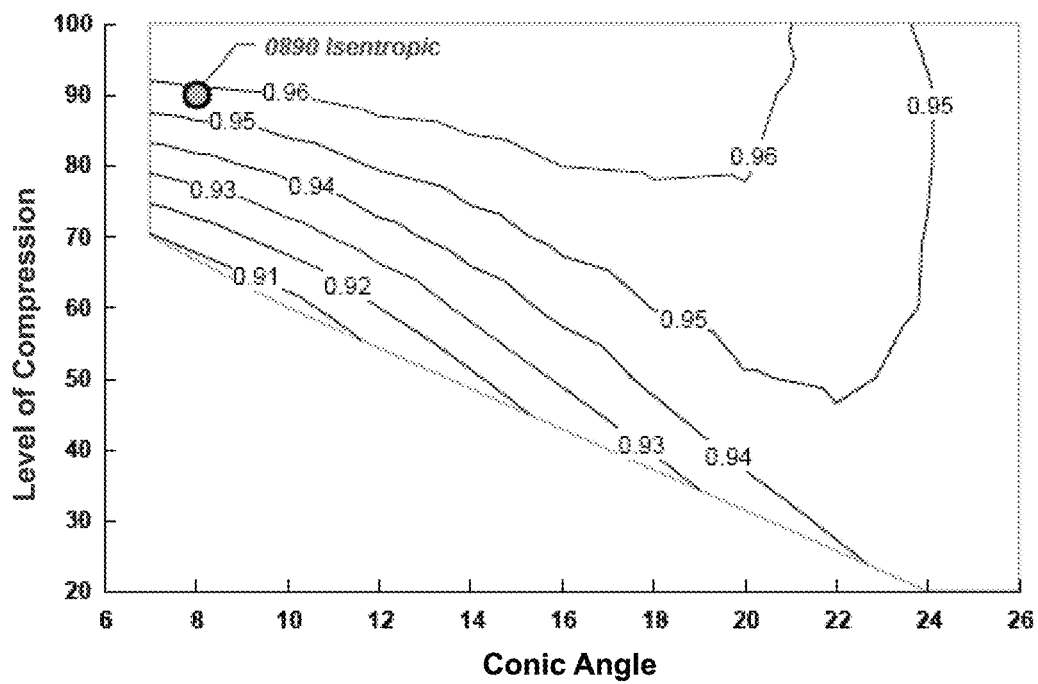
Figure 5-B

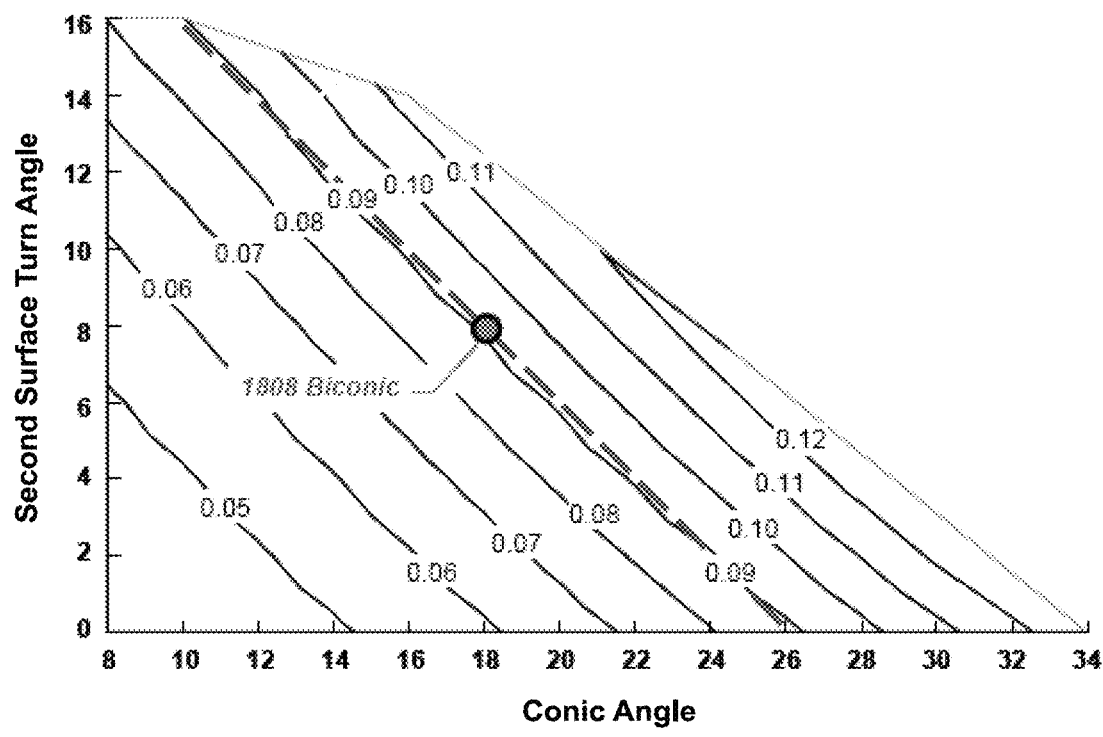
Figure 6-A
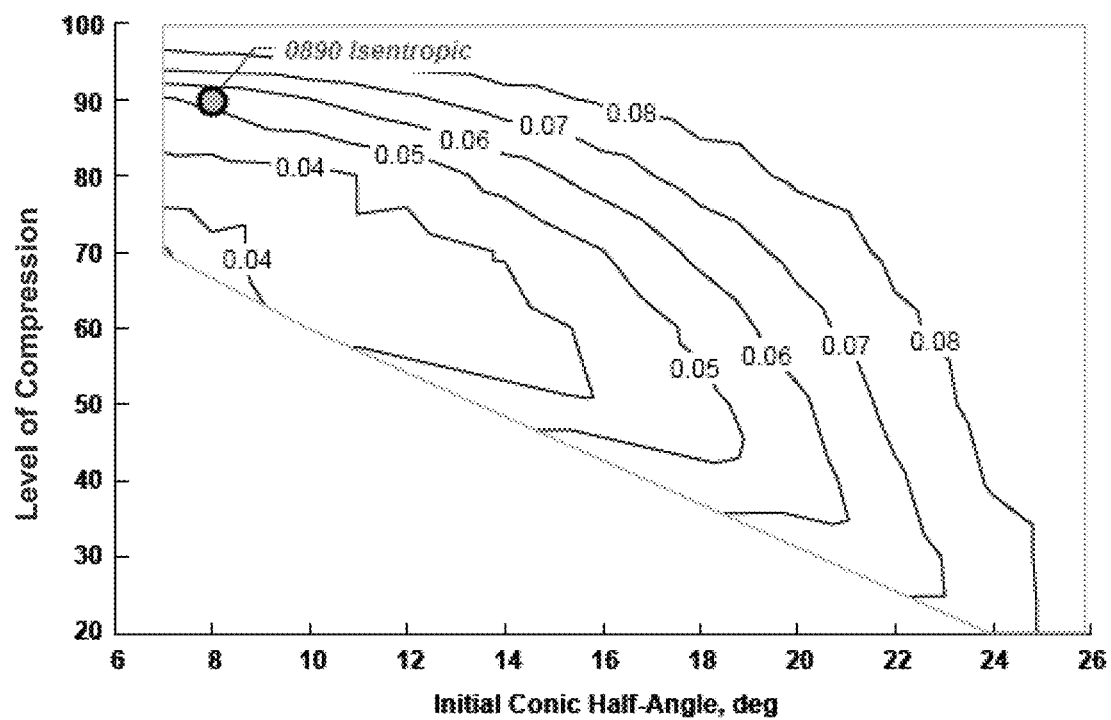
Figure 6-B

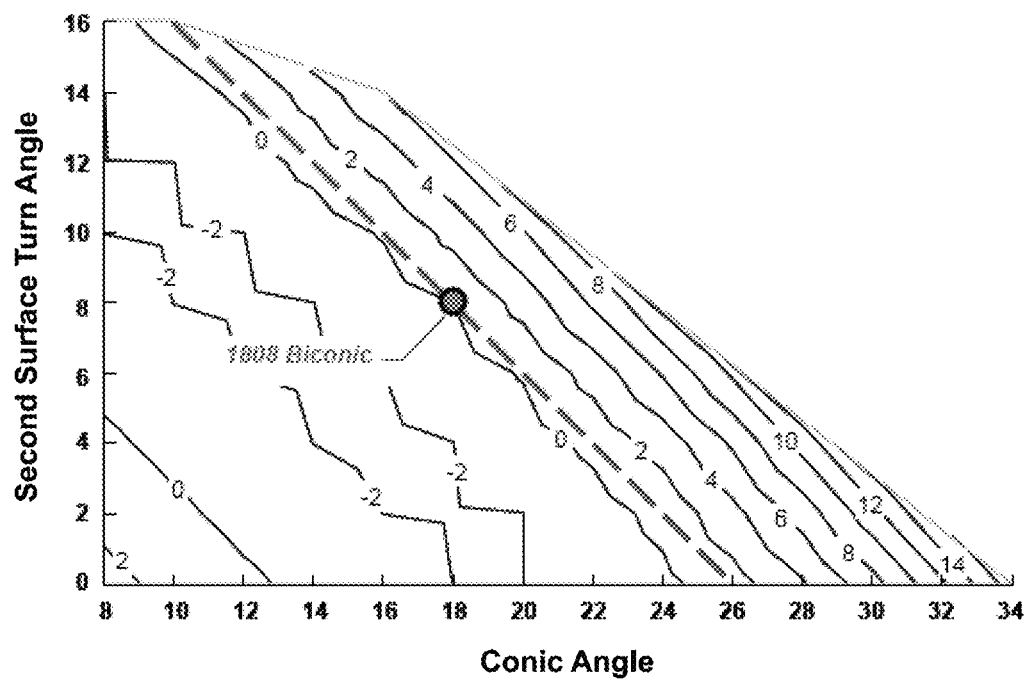
Figure 7-A
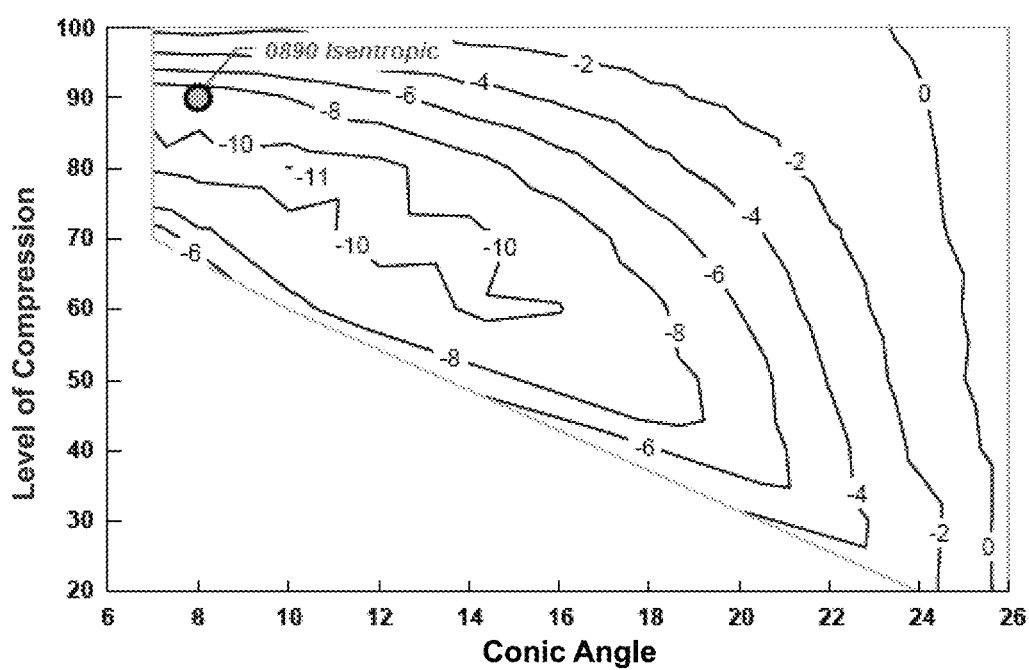
Figure 7-B

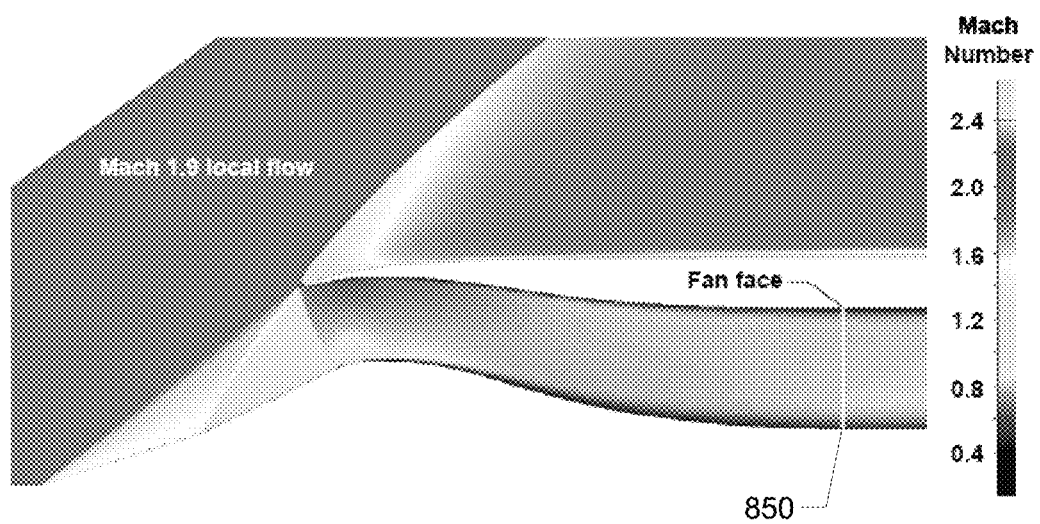
Figure 8-A
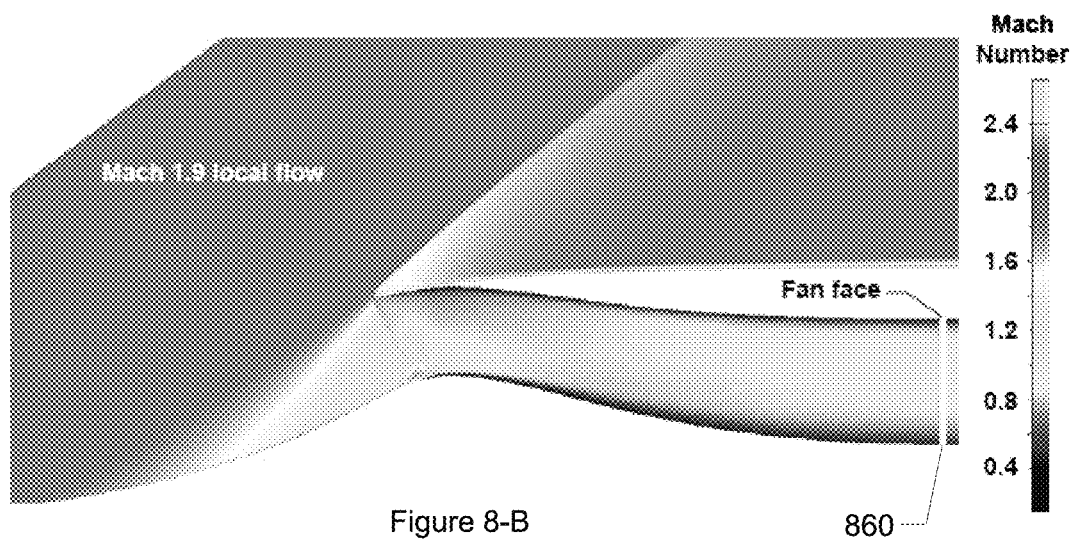
Figure 8-B

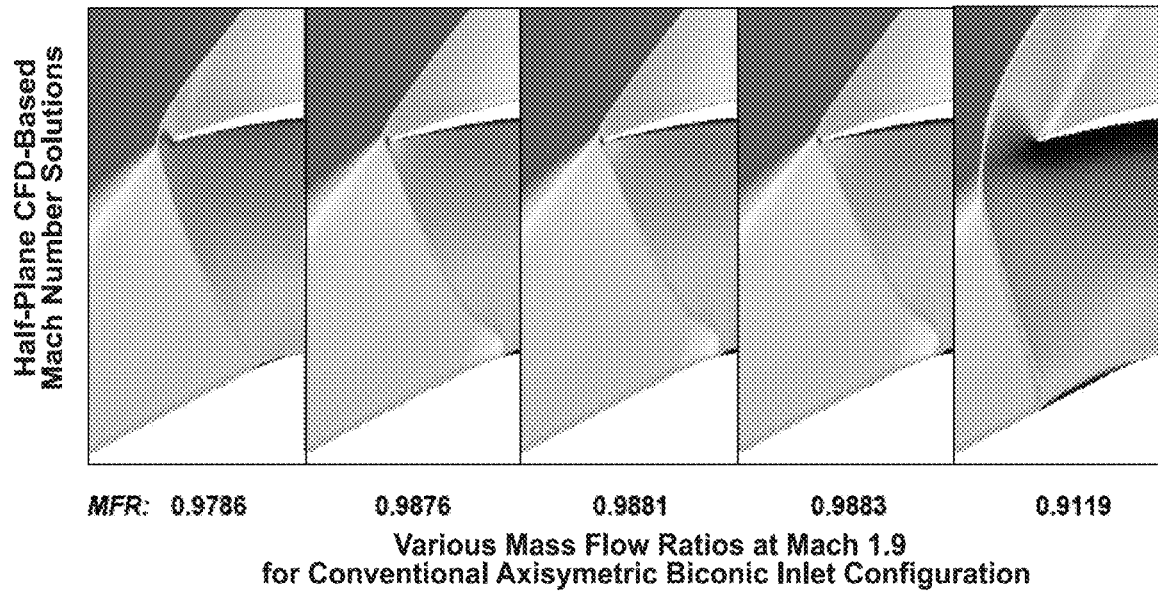
Various Mass Flow Ratios at Mach 1.9
for Conventional Axisymetric Biconic Inlet Configuration
Figure 9-A
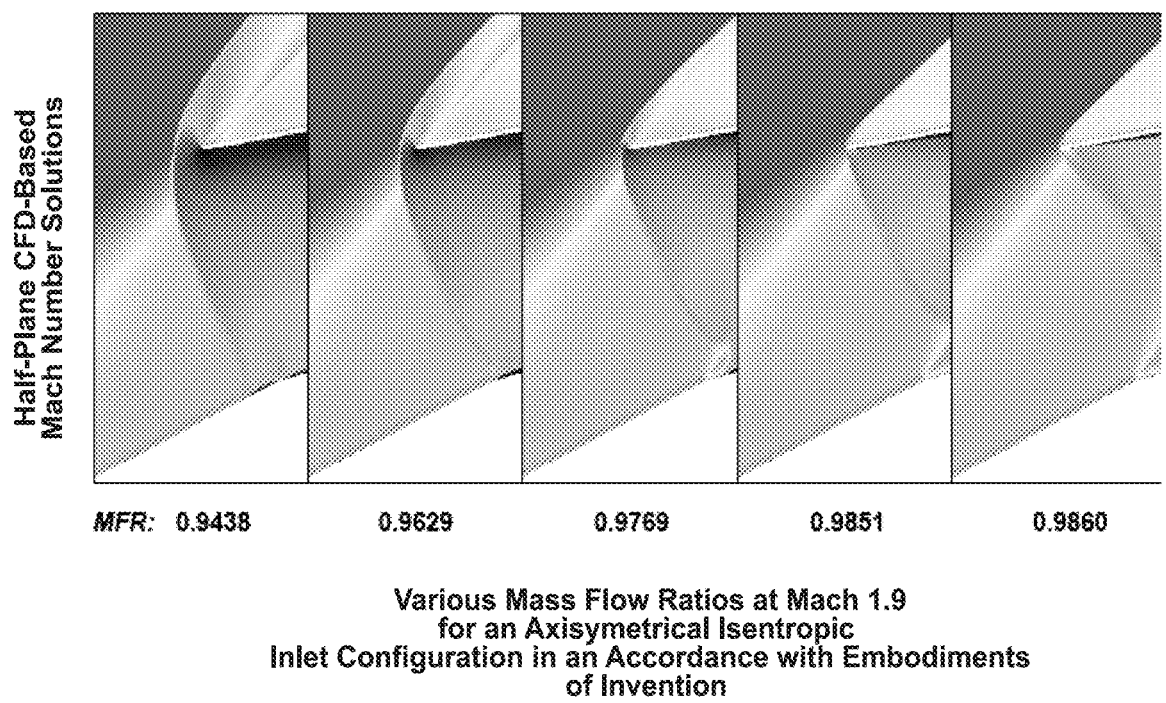
Various Mass Flow Ratios at Mach 1.9
for an Axisymetrical Isentropic
Inlet Configuration in an Accordance with Embodiments
of Invention
Figure 9-B

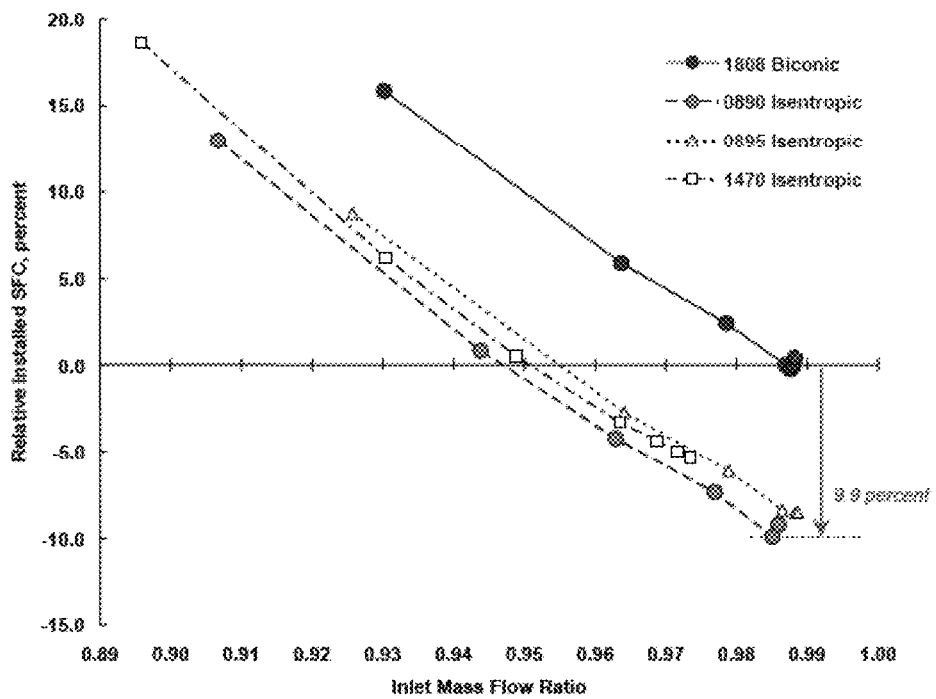
Figure 14-A
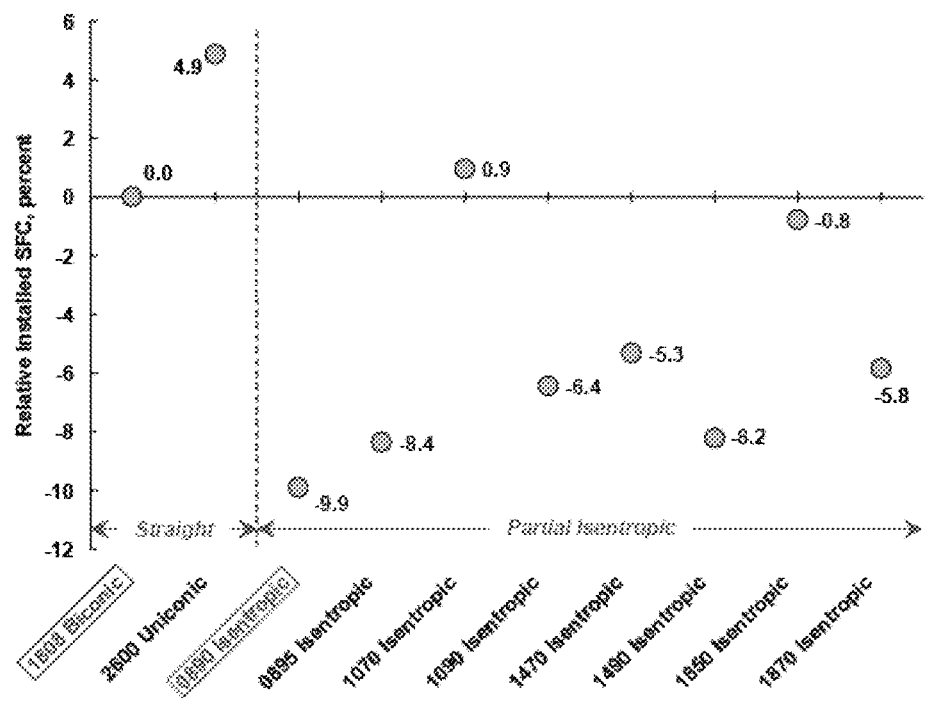
Figure 14-B

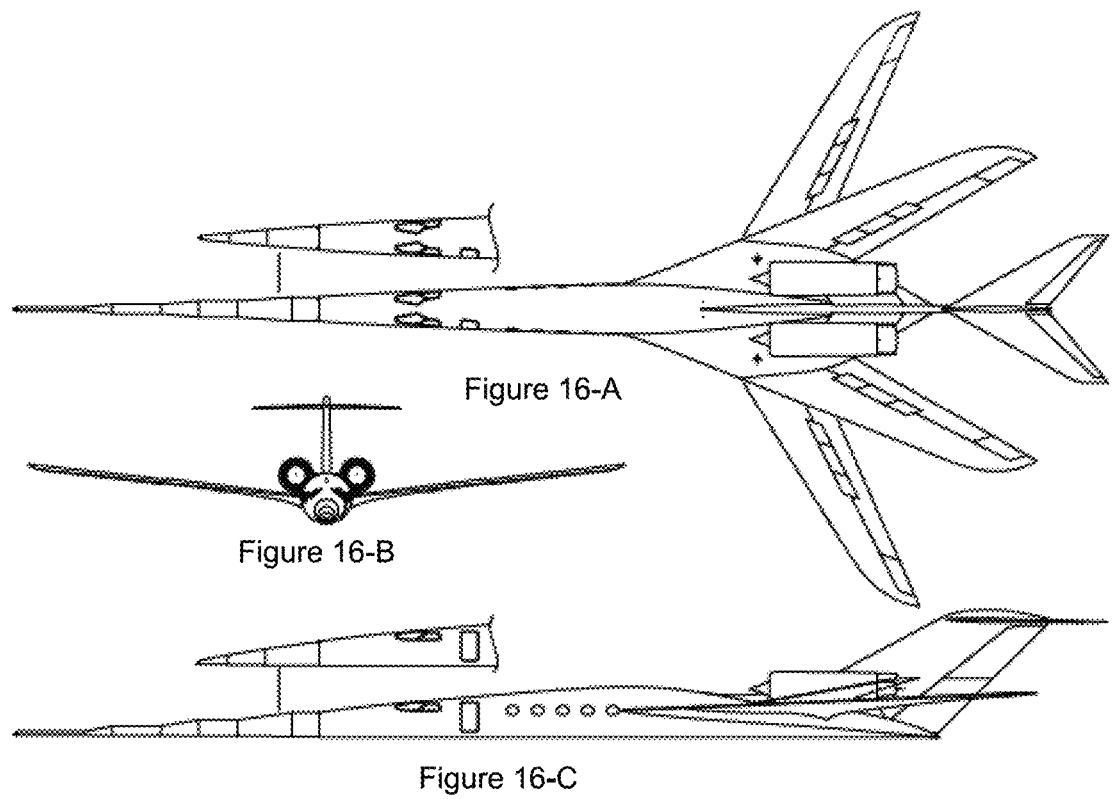
Figure 16-A
Figure 16-B
Figure 16-C
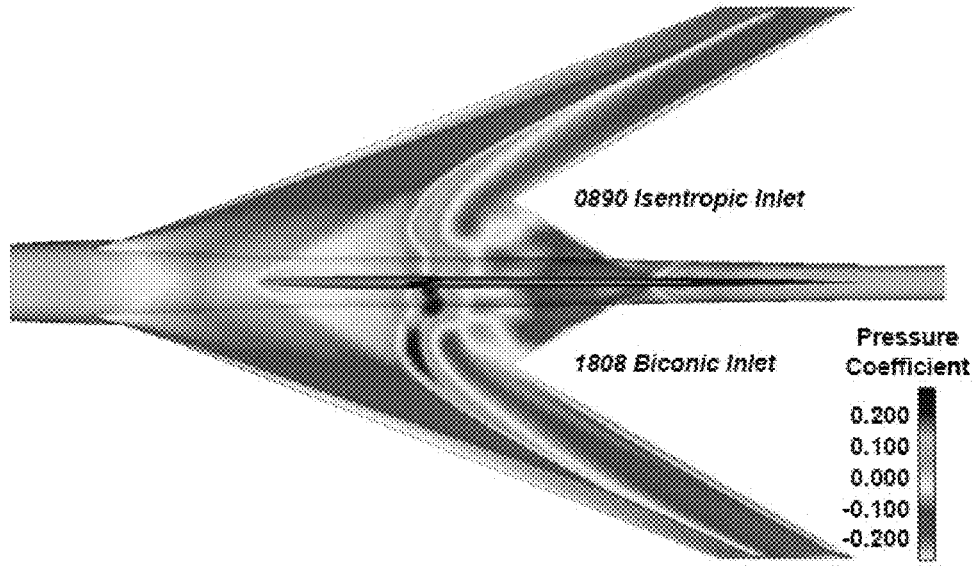
Figure 17

ISENTROPIC COMPRESSION INLET FOR SUPERSONIC AIRCRAFT

CROSS-REFERENCE TO RELATED APPLICATION

This is a Divisional Application of U.S. application Ser. No. 13/629,181, filed Sep. 27, 2012, now issued as U.S. Pat. No. 9,482,155, which is a continuation of U.S. Non-Provisional patent application Ser. No. 11/639,339 filed Dec. 15, 2006, and entitled "Isentropic Compression Inlet For Supersonic Aircraft," which, in turn, claims priority to the U.S. Provisional Patent Application 60/750,345, filed Dec. 15, 2005, and entitled "Supersonic Inlet Shaped for Dramatic Reductions in Drag and Sonic Boom Strength". Each of the above identified patent applications are hereby incorporated herein by reference in their entireties.

FIELD OF THE INVENTION

The embodiments of the invention are related to supersonic inlets for supersonic aircraft and more particularly to supersonic inlet shaped to reduce drag and sonic boom strength.

BACKGROUND OF THE INVENTION

Many supersonic aircraft employ gas turbine engines that are capable of propelling the aircraft at supersonic speeds. These gas turbine engines, however, generally operate on subsonic flow in a range of about Mach 0.3 to 0.6 at the upstream face of the engine. The inlet decelerates the incoming airflow to a speed compatible with the requirements of the gas turbine engine. To accomplish this, a supersonic inlet is comprised of a compression surface and corresponding flow path, used to decelerate the supersonic flow into a strong terminal shock. Downstream of the terminal shock, subsonic flow is further decelerated using a subsonic diffuser to a speed corresponding with requirements of the gas turbine engine.

As is known in the art, the efficiency of the supersonic inlet and the diffusion process is a function of how much total pressure is lost in the air stream between the entrance side of the inlet and the discharge side. The total-pressure recovery of an inlet is defined by a ratio of total pressure at the discharge to total pressure at freestream.

Supersonic inlets are typically either "2D", having a rectangular opening, or axisymmetric, having a circular opening. The supersonic inlet includes a throat positioned between a converging supersonic diffuser and a diverging subsonic diffuser. Supersonic inlets are generally also classified into three types: internal compression, mixed compression, and external compression.

Internal compression inlets accomplish supersonic and subsonic compression completely within the interior of the inlet duct. The primary theoretical advantage of this inlet type is the extremely low cowling angle that results from a completely internalized shock train. While this inlet design appears theoretically advantageous, in practice it requires a complex and performance-penalizing shock control system in order to position the shock train, to "start" the inlet, and to maintain dynamic shock stability to avoid the inlet's high sensitivity to shock train expulsion ("unstart"). The challenges associated with this type of inlet have limited its use to primarily air-breathing missile applications designed for high Mach number. Below speeds of about Mach 3.5, mixed compression and external compression inlets offer a more practical compromise between performance and complexity.

As the name implies, mixed compression inlets offer a blending of external and internal compression and seek a more practical balance between performance and complexity than that offered by fully internal compression designs in the Mach range from approximately 2.5 to 3.5. The internal portion of the shock train of a mixed compression inlet is less sensitive to flow disturbances than a fully internal design, and has lower cowling angle and drag than a fully external compression inlet designed to the same speed. But mixed compression nevertheless requires a complex control system for starting the internal shock train and for stability management to avoid inlet unstart. Two notable applications of mixed compression include the inlets on the XB-70 Valkyrie and SR-71 Blackbird aircraft.

External compression inlets are most appropriate for applications below about Mach 2.5. In this speed range, external compression offers a design simplicity that typically outweighs its generally inferior pressure recovery. Because the shock train is completely external, cowling angles, and therefore installed drag characteristics, tend to be higher when compared against internal and mixed compression designs at similar speed. However, because the shock train on an external compression inlet remains completely outside of the internal flow path, it is not subject to the sudden unstart expulsion produced by upstream or downstream flow disturbances. External compression shock stability is therefore superior to mixed or internal compression designs, requiring a significantly less complicated inlet control system. Notable examples of inlets employing external compression include those used on the Concorde, the F-14 Tomcat, and the F-15 Eagle.

Traditional inlet design methods have generally focused on improving propulsion system performance by maximizing total inlet pressure recovery and hence gross engine thrust. Complicated secondary systems and variable geometry inlets are often used to accomplish this. While high pressure recovery definitely provides certain gains, maximizing pressure recovery typically comes at the price of significant inlet drag and inlet complexity, characteristics that typically run counter to a robust and low cost-of-operation design.

For example, attempts to increase pressure recovery include bleed air-based methods, which, as is understood in the art, improve inlet pressure recovery through shock strength management and boundary layer removal. The Concorde used a method of bleed air extraction at the inlet throat that weakened the strength of the terminal shock thereby improving total pressure recovery. However, bleed air-based methods typically take a large portion of the intake flow to produce the desired results and suffer corresponding drag-related penalties once the bleed flow is eventually dumped back overboard. Additionally, extensive secondary systems are typically required, consisting of complex flow routing equipment.

Inlet ramp positioning is another method used to improve pressure recovery through more optimum placement of the compression shock system, particularly at off-design operating conditions. The Concorde, F-14, and F-15 are all examples of aircraft that employ ramp positioning for improved pressure recovery. However, ramp positioning requires electric or hydraulic actuators and an inlet control system, resulting in a large increase in inlet part count and complexity. Such systems introduce potential failure points and add significantly to development and operating costs.

The traditional supersonic inlet design process begins with the selection of compression surface geometry that best meets the performance and integration requirements of the intended application, for example aircraft design speed and/or terminal shock Mach number. For an external compression inlet, a compression surface configuration typically focuses the inlet-generated shocks, at supersonic design cruise speed, at a location immediately forward of the cowl highlight or cowl lip, generally referred to as shock-on-lip focusing. This arrangement generally provides good pressure recovery, low flow spillage drag, and a predictable post-shock subsonic flow environment that lends itself to more basic analytical techniques and explains the technique's traceability to the earliest days of supersonic inlet design.

External compression inlet design practice also uses cowl lip angle to align the cowling lip with the local supersonic flow in the vicinity of the terminal shock and the cowl lip. Aligning the lip with the local flow helps to prevent the formation of an adverse subsonic diffuser flow area profile or a complex internal shock structure in the lip region, which reduce inlet pressure recovery and flow pumping efficiency, as well as undermine diffuser flow stability.

However, as understood in the art, as supersonic design speed increases, so does the amount of compression necessary to decelerate the flow to a fixed terminal shock Mach number. Additional compression implies the need for more flow-turning off of the inlet axis, resulting in a corresponding increase in the cowl lip angle (in order to align the cowl lip angle with the local flow at the terminal shock). Any increase in cowl lip angle results in additional inlet frontal area, increasing inlet drag as speed increases. This adverse trend is a key reason why conventional external compression inlets lose viability at high supersonic Mach numbers.

One attempt to control cowl lip drag, as discussed in U.S. Pat. No. 6,793,175 issued to Sanders, includes configuring the inlet to minimize the shape and size of the cowl. Sanders' concept involves morphing a traditional rectangular intake into a more complex, but higher performance, 3-D geometry that, in a frontal view, initially resembles a circumferential sector of an axisymmetric intake, but now with the compression surface on the outer radius and the cowling on the inner radius. The cowl side extends across a similar circumferential angular arc in a frontal view, but because it is located on an inner radius, the physical arc of the cowl is reduced. The cowl drag is said to be effectively lessened through a reduction in transcribed circumferential distance. The practicality of this inlet concept is reduced by aircraft integration challenges created by the 3-D geometry. For example, the cross-sectional shape may be more difficult to integrate from a packaging perspective than an equivalent axisymmetric design for podded propulsion systems. In addition, the complex inlet shape is likely to create complex distortion patterns that require either large scale mitigating techniques in the subsonic diffuser or the use of engines with more robust operability characteristics.

Another method to reduce cowl lip angle to reduce drag involves decreasing the flow turn angle by increasing the inlet terminal shock Mach number. However, the improvement in installed drag in using a higher terminal shock Mach number is often offset by the loss in thrust from the reduction in pressure recovery resulting from the stronger terminal shock. As understood by those in the art, increasing the terminal shock Mach number also encounters significant limitations in practice once viscous flow effects are introduced. Higher terminal shock Mach numbers aggravate the shock-boundary layer interaction and reduce shock base boundary layer health. The increase in shock strength in the base region also reduces inlet buzz margin, reducing subcritical flow throttling capability. Additionally, the increase in terminal shock Mach number ultimately increases the likelihood for the need of a complex boundary layer management or inlet control system Inlet compression surfaces are typically grouped as either 'straight' or 'isentropic.' An isentropic surface generally represents a continuously curved surface that produces a continuum of infinitesimally weak shocklets during the compression process. By contrast, a straight surface generally represents flat ramp or conic sections that produce discrete oblique or conic shocks. While an inlet employing an isentropic surface can have theoretically better pressure recovery than an inlet employing a straight-surface designed to the same operating conditions, real viscous effects combine to reduce the overall performance of isentropic inlets and can lead to poorer boundary layer health when compared to their equivalent straight-surface counterparts. Both straight and isentropic inlet types conventionally designed to the same terminal shock Mach number also produce similar flow turn angle at the cowl lip and, consequently, similar cowl lip angles. As such, neither the straight-surface inlet design nor the conventional isentropic inlet design provides a cowl drag benefit relative to the other.

As such, conventional design provides no significant latitude for adjusting the geometric arrangement of inlet and the cowl lip when designing a mechanically simple inlet compression surface using conventional shock-on-lip focusing. Because the isolated cowl drag characteristics are relatively inflexible, inlet drag relief has historically been limited to minimizing inlet-airframe interference effects.

SUMMARY OF THE INVENTION

Embodiments of the invention employ a relaxed isentropic compression shaping of the compression surface of an inlet design. As used herein, the term "relaxed isentropic compression" surface refers to an isentropic compression surface characterized by a series of Mach lines in which at least a plurality of those Mach lines do not focus on the focus point where the initial shock and the terminal shock meet. This lack of Mach line focusing results in a total level of compression less than the level of compression generated by a conventional isentropic compression surface designed to the same criteria. The relaxed isentropic compression design approach may be applied to any external compression or mixed compression inlet concept, including axisymmetric, partial conic, and two-dimensional intakes. The cowling angles for external compression inlets designed with a relaxed isentropic compression surface may be reduced to approach those employed by traditional mixed compression inlets, merging the inherent shock stability robustness of external compression geometry with the high installed performance of mixed compression geometry.

To be explained more fully below, relaxed isentropic compression inlet shaping provides an increase in the design latitude for lofting the inlet cowling region while permitting control over other key inlet design parameters such as terminal shock Mach number, diffuser flow distortion, and total pressure recovery. The relaxed isentropic compression inlet shaping may also enable a reduction in cowling surface angles and, as a result, may be configured to improve inlet drag and interference drag characteristics. The reduced slope of the cowling may also lower the contribution of the inlet to the overall vehicle sonic boom characteristic during supersonic flight and decrease the potential for aerodynamic cross-interference between close-coupled inlets.

Embodiments of the invention may includes a supersonic inlet comprising a leading edge configured to generate an initial shock wave and a compression surface positioned downstream of the leading edge and having at least one curved section configured to generate isentropic compression. The supersonic inlet may also include a cowl lip spatially separated from the compression surface such that the cowl lip and the compression surface define an inlet opening for receiving a supersonic flow. The compression surface may be configured to generate a second shock wave that, during operation of the supersonic inlet at a predetermined cruise speed, extends from the compression surface to intersect the initial shock wave at a point substantially adjacent to the cowl lip. The isentropic compression generated by the curved section may be characterized by a series of Mach lines where, during operation of the supersonic inlet at the predetermined cruise speed, at least a plurality of the Mach lines do not focus on the point substantially adjacent to the cowl lip.

In another non-limiting embodiment, an external compression surface is disclosed for a supersonic jet engine inlet of the type which includes a cowl having a cowl lip. The external compression surface includes, but is not limited to, a first straight segment that is disposed proximate a foremost point of the compression surface and that is inclined at a first substantially constant turn angle with respect to the freestream. The first straight segment is configured to generate a first oblique shock that is focused proximate the cowl lip at a predetermined design cruising speed. The external compression surface further includes, but is not limited to, a curved segment that is structurally contiguous with, and aft of, the first segment and inclined with respect to the freestream at a varying angle that is greater than the first substantially constant turn angle and aft increasing. The curved segment includes, but is not limited to, a relaxed isentropic compression surface that is configured to generate a continuum of infinitesimally weak shocklets that are defocused away from the cowl lip at the predetermined design cruising speed. The external compression surface still further includes, but is not limited to, a second straight segment that is structurally contiguous with, and aft of, the curved segment and inclined at a second substantially constant turn angle that is greater than the first substantially constant turn angle with respect to the freestream.

In another non-limiting embodiment, an inlet is disclosed for a supersonic jet engine of the type including a cowl lip and a center body having an external compression surface. The inlet includes, but is not limited to, in cross section, a first, straight segment that is disposed at a foremost point of the compression surface and that is inclined at a constant initial turn angle α with respect to the freestream. The inlet further includes, but is not limited to, a second, curved segment that is disposed adjacent to, and aft of, the first segment. The second segment is inclined with respect to the freestream at a varying angle that is greater than α and which increases in the aft direction. The inlet further still includes, but is not limited to, a third straight segment that is disposed adjacent to, and aft of the second segment, the third segment being inclined at a constant second turn angle β>α with respect to the free stream vector. The first, second, and third segments are structurally contiguous and disposed fore of the cowl lip. The first segment is configured such that, at a predetermined design cruising speed, the first segment generates a first oblique shock focused proximate the cowl lip. The external compression surface is disposed such that, at a predetermined design cruising speed, a terminal shock extends from a point proximate the cowl lip to the external compression surface. The second, curved segment comprises a relaxed isentropic surface which differs from a conventional isentropic surface in that the relaxed isentropic surface is configured to produce, at a predetermined design cruising speed, a continuum of infinitesimally weak shocklets, a plurality of which are defocused away from the cowl lip and extend along the terminal shock.

In another non-limiting embodiment, an inlet is disclosed for a supersonic jet engine of the type including a cowl lip and a center body having an external compression surface. The inlet, in cross section, includes, but is not limited to a first, straight segment disposed at a leading point of the compression surface and inclined at a constant initial turn angle α with respect to a free stream vector. The inlet further includes, but is not limited to, a second, curved segment disposed adjacent to and aft of the first segment. The second segment is inclined with respect to the free stream vector at a varying angle greater than α and which increases in the aft direction. The inlet still further includes, but is not limited to a third, straight segment disposed adjacent to, and aft of, the second segment, the third segment being inclined at a constant second turn angle β>α with respect to the free stream vector. The first, second, and third segments are structurally contiguous and disposed fore of the cowl lip. The first segment is configured such that, at a predetermined design cruising speed, the first segment generates a first oblique shock focused proximate the cowl lip. The external compression surface is disposed such that, at a predetermined design cruising speed, a terminal shock extends from a point proximate the cowl lip to the external compression surface. A conventional isentropic compression surface comprises a continuously curved compression surface segment which, at a predetermined design cruising speed, is characterized by a continuum of infinitesimally weak shocklets focused at the cowl lip. The second, curved segment comprises a relaxed isentropic compression surface which differs from a conventional isentropic compression surface in that the relaxed isentropic surface, at a predetermined design cruising speed, is characterized by a continuum of infinitesimally weak shocklets, a plurality of which are defocused away from the cowl lip and extend along the terminal shock.

In another non-limiting embodiment, an external compression inlet is disclosed for use with a supersonic jet engine. The external compression inlet includes, but is not limited to, a cowl having a cowl lip. The external compression inlet further includes, but is not limited to, an external compression surface comprising, in cross section, a curved segment inclined with respect to the freestream at a varying angle which increases in the aft direction. The external compression surface is disposed such that, at a predetermined design cruising speed, a terminal shock extends from a point proximate the cowl lip to the external compression surface. The curved segment comprises a relaxed isentropic compression surface which differs from a conventional isentropic compression surface in that the relaxed isentropic compression surface, at the predetermined design cruising speed, is characterized by a continuum of infinitesimally weak shocklets, a plurality of which are defocused away from the cowl lip and extend along the terminal shock.

In another non-limiting embodiment, an external compression inlet is disclosed for use in a jet engine of the type including a compression surface having a foremost point and a cowl lip characterized by a cowl lip angle. The inlet, in cross section, includes, but is not limited to, an initial segment that is disposed at the leading edge of the compression surface and that is inclined at a constant, initial turn angle α with respect to the free stream. The initial segment is configured to produce, at a predetermined design cruising speed, a bow shock which intersects an intersection point proximate the cowl lip. The inlet still further includes, but is not limited to, a continuously curved segment aft of and structurally contiguous with the initial segment. The continuously curved segment is configured to cooperate with the initial segment to produce, at the predetermined design cruising speed, a terminal shock which extends from the predetermined intersection point to the compression surface. The curved segment is configured to produce, at the predetermined design cruising speed, infinitesimally weak shocklets generally directed toward a portion of the terminal shock which extends away from the cowl lip. The local angle of inclination of each of a plurality of successive points along the curved segment is relaxed relative to a traditional, unrelaxed isentropic surface, such that at the predetermined design cruising speed a plurality of infinitesimally weak shocklets extend from the relaxed portion of the curved segment and intersect the terminal shock aft of and spaced apart from the predetermined design point, and do not focus at the predetermined intersection point.

A non-limiting embodiment of a method is disclosed for relaxing the geometry of an isentropic region of a compression surface to facilitate a reduced cowl lip angle in an external compression inlet. The method includes, but is not limited to, providing an initial, straight segment at one of a leading edge and an apex of the compression surface at a constant, initial turn angle α with respect to the free stream. The method further includes, but is not limited to, positioning the cowl lip at a predetermined distance aft of the one of the leading edge and the apex such that, at a specific and predetermined design cruising speed, the initial segment produces a bow shock which intersects a predetermined intersection point proximate the cowl lip. The method further includes, but is not limited to, defining, for the specific and predetermined design cruising speed, a terminal shock which extends from the predetermined intersection point to the compression surface. The method further includes, but is not limited to, providing a continuously curved concave segment aft of and structurally contiguous with the initial segment. The method further includes, but is not limited to, configuring the continuously curved concave segment to produce, at the specific and predetermined design cruising speed, a plurality of successive infinitesimally weak shocklets generally directed towards a portion the terminal shock which extends away from the cowl lip. The method still further includes, but is not limited to, relaxing, for a plurality of successive points in the aft direction along the continuously curved concave segment, the local angle of inclination of the continuously curved concave segment relative to a traditional isentropic surface, such that at the specific and predetermined design cruising speed a plurality of shocklets extend from the relaxed portion of the continuously curved concave segment and intersect the terminal shock aft of and away from the predetermined design point, and do not focus at the predetermined intersection point.

In another non-limiting embodiment, an external compression supersonic inlet is disclosed. The external compression supersonic inlet includes, but is not limited to, a leading edge or leading point that is configured to generate an initial shock in a supersonic flow. The external compression supersonic inlet further includes, but is not limited to, a compression surface that is positioned downstream of the leading edge or leading point. The compression surface includes a concave portion that includes, but is not limited to, a relaxed isentropic compression surface and is configured to generate a plurality of Mach lines in the supersonic flow. The external compression supersonic inlet further includes, but is not limited to, a cowl lip that is spaced apart from the compression surface, the cowl lip configured to generate a terminal shock in the supersonic flow. The leading edge or leading point is further configured to cause the initial shock to extend to a point substantially adjacent the cowl lip at a predetermined cruise speed. The cowl lip is further configured to cause the terminal shock to intersect the initial shock at the point substantially adjacent the cowl lip and to extend from the point substantially adjacent the cowl lip to the compression surface at the predetermined cruise speed. The relaxed isentropic compression surface is further configured to direct the plurality of Mach lines to extend from the relaxed isentropic compression surface to the terminal shock at a respective plurality of locations disposed radially along the terminal shock between the cowl lip and the compression surface at the predetermined cruise speed.

In another non-limiting embodiment, an external compression supersonic inlet is disclosed. The external compression supersonic inlet includes, but is not limited to, a leading edge or leading point that is configured to generate an initial shock in a supersonic flow. The external compression supersonic inlet further includes, but is not limited to, a compression surface that is positioned downstream of the leading edge or leading point. The compression surface includes a concave portion that includes, but is not limited to, a relaxed isentropic compression surface and is configured to generate a plurality of Mach lines in the supersonic flow. The external compression supersonic inlet further includes, but is not limited to, a cowl lip that is spaced apart from the compression surface, the cowl lip configured to generate a terminal shock in the supersonic flow. The leading edge or leading point is further configured to cause the initial shock to extend to a point adjacent the cowl lip at a predetermined cruise speed. The cowl lip is further configured to cause the terminal shock to intersect the initial shock at the point adjacent the cowl lip and to extend from the point adjacent the cowl lip to the compression surface at the predetermined cruise speed. The relaxed isentropic compression surface is further configured to direct the plurality of Mach lines to extend from the relaxed isentropic compression surface to the terminal shock at a respective plurality of locations disposed radially along the terminal shock between the cowl lip and the compression surface at the predetermined cruise speed.

BRIEF DESCRIPTION OF THE DRAWINGS

While the specification concludes with claims particularly pointing out and distinctly claiming embodiments of the invention, it is believed the same will be better understood from the following descriptions taken in conjunction with the accompanying drawings, which illustrate, in a non-limiting fashion, the best mode presently contemplated for carrying out embodiments of the invention, and in which like reference numerals designate like parts throughout the Figures, wherein:

FIG. 1-A shows a cross-section of a conventional straight-surface external compression inlet;

FIG. 1-B shows an inviscid flow solution for the conventional straight-surface external compression inlet shown in FIG. 1-A;

FIG. 2-A shows a cross-section of a relaxed isentropic compression external compression inlet in accordance with an embodiment of the invention;

FIG. 2-B shows an inviscid flow solution for the traditional isentropic compression surface;

FIG. 2-C shows an inviscid flow solution for the relaxed isentropic compression surface shown in FIG. 2-A;

FIG. 3-A shows a cross section of a relaxed isentropic compression external compression inlet and subsonic diffuser in accordance with an embodiment of the invention demonstrating an example of poor cross-sectional area matching between intake and engine;

FIG. 3-B shows a cross section of a relaxed isentropic compression external compression inlet and subsonic diffuser in accordance with an embodiment of the invention demonstrating an example of good cross-sectional area matching between intake and engine;

FIG. 4-A shows a centerline cross section of a conventional biconic or twin straight surface axisymmetric external compression inlet designed for Mach 1.9 local flow speed;

FIG. 4-B shows a centerline cross section of a relaxed isentropic compression axisymmetric external compression inlet designed for Mach 1.9 local flow speed in accordance with an embodiment of the invention;

FIG. 5-A shows inviscid total pressure recovery results at Mach 1.9 for various conventional axisymmetric uniconic and biconic inlet configurations;

FIG. 5-B shows inviscid total pressure recovery results at Mach 1.9 for various axisymmetric isentropic inlet configurations in accordance with an embodiment of the invention;

FIG. 6-A shows cowl drag coefficient results at Mach 1.9 for various conventional axisymmetric uniconic and biconic inlet configurations;

FIG. 6-B shows cowl drag coefficient results at Mach 1.9 for various axisymmetric isentropic inlet configurations in accordance with an embodiment of the invention;

FIG. 7-A shows specific fuel consumption results at Mach 1.9 for various conventional axisymmetric uniconic and biconic inlet configurations;

FIG. 7-B shows specific fuel consumption results at Mach 1.9 for various axisymmetric isentropic inlet configurations in accordance with an embodiment of the invention;

FIG. 8-A shows a half-plane CFD-based Mach number solution at Mach 1.9 for a conventional axisymmetric biconic inlet configuration;

FIG. 8-B shows a half-plane CFD-based Mach number solution at Mach 1.9 for an axisymmetric isentropic inlet configuration in accordance with an embodiment of the invention;

FIG. 9-A shows half-plane CFD-based Mach number solutions for various mass flow ratios or MFR at Mach 1.9 for a conventional axisymmetric biconic inlet configuration;

FIG. 9-B shows half-plane CFD-based Mach number solutions for various mass flow ratios or MFR at Mach 1.9 for a axisymmetric isentropic inlet configuration in accordance with an embodiment of the invention;

FIG. 14-A shows CFD-based specific fuel consumption data as a function of mass flow ratio at Mach 1.9 for various axisymmetric conventional inlets and isentropic inlets according to an embodiment of the invention;

FIG. 14-B shows CFD-based specific fuel consumption data at near-critical flow at Mach 1.9 for various axisymmetric conventional inlets and isentropic inlets according to an embodiment of the invention;

FIG. 16-A through FIG. 16-C show a top view, front view, and side view, respectively, of a supersonic jet aircraft configuration;

FIG. 17 shows a CFD-based pressure solution of wing and fuselage surfaces at freestream Mach 1.8 for a conventional axisymmetric inlet installed on the left side of the aircraft and an axisymmetric isentropic inlet according to an embodiment of the invention installed on the right side of the aircraft.

DETAILED DESCRIPTION OF THE INVENTION

Figure 10:
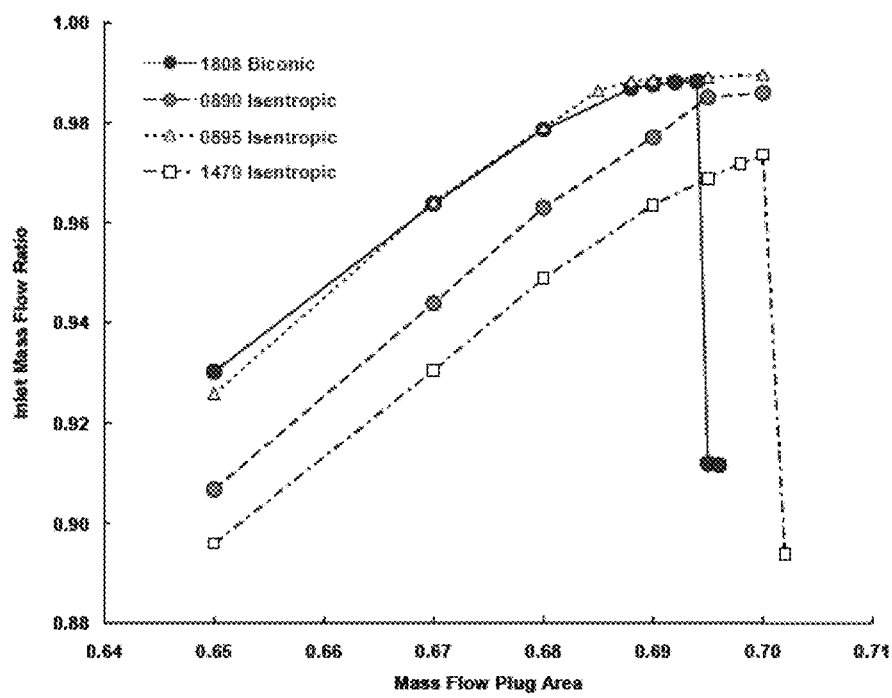
FIG. 10 shows CFD-based mass flow ratio data as a function of inlet mass flow plug area at Mach 1.9 for various axisymmetric conventional inlets and isentropic inlets according to an embodiment of the invention.

The present disclosure will now be described more fully with reference to the Figures in which various embodiments of the invention are shown. The subject matter of this disclosure may, however, be embodied in many different forms and should not be construed as being limited to the embodiments set forth herein.

Embodiments of the invention relate to supersonic inlet shaping which improves the net propulsive force through relaxed isentropic compression surfaces. As discussed above, "relaxed isentropic compression" refers to an isentropic compression surface characterized by a series of Mach lines that do not necessarily focus at the point where the initial oblique shock and the terminal shock meet. In accordance with embodiments of the invention, overall performance improvement may be accomplished using relaxed isentropic compression inlet configurations even when the inlet exhibits relatively poor total pressure recovery characteristics. Further, inlets employing relaxed isentropic compression shaping may achieve net improvements without reliance on complicated secondary systems or variable geometry.

FIG. 1-A shows a cross-section of a straight-surface external compression inlet 100 configured using shock-on-lip focusing. The inlet 100 includes a compression surface 110 having a twin straight surface construction with a first straight surface 111 at an initial turn angle 110a and a second straight surface 112 at a second turn angle 110b. The inlet 100 also includes a cowl lip 120 which is positioned at a cowl angle of 110c measured off the centerline of the inlet 100. The compression surface 110 transitions to the shoulder 130 which defines the throat 135, the narrowest portion of the inlet 100 flowpath. After the throat 135, a diffuser 140 provides a divergent flow path delivering subsonic flow to the engine (not shown in FIG. 1-A).

During flight, the inlet 100 encounters supersonic flow in the direction indicated by the arrow A and captures air flow shown in the region B. An initial shock 200 forms when the supersonic flow initially encounters the apex of compression surface 110. A secondary shock 210 forms at the transition between the first straight surface 111 and the second straight surface 112 of the compression surface 110. Finally, a terminal shock 220 forms at the transition between the second straight surface 112 and the shoulder 130. A cowl shock 230 is shown extending upward off the cowl lip 120. As shown in FIG. 1-A, it should be noted that the initial shock 200, the secondary shock 210 and the terminal shock 220 are focused at the shock focus point 240. Shock focusing at or in close proximity to the cowl lip is used to maximize the capture flow area B to reduce additive drag caused by excess flow spillage around the inlet.

FIG. 1-B shows an inviscid flow solution for the straight-surface external compression inlet 100 shown in FIG. 1-A. An inviscid flow solution, where the solution does not account for viscosity of the fluid, may be acquired using analytical techniques such as method-of-characteristics (MOC). The basic computational techniques that define the underlying method-of-characteristics process are well-known to those skilled in the art and are available as code in the public domain. Compared to viscous results from higher order tools, such as computational fluid dynamics (CFD), inviscid solutions can be obtained rapidly and without the need for extensive computation resources. Inviscid solutions usually possess a level of fidelity adequate for performing initial parametric surveys and definition of the design space. However, as would be apparent to those of skill in the art, CFD analysis, and even hand calculations, could be used exclusively as an analytical tool.

The inviscid flow solution shown in FIG. 1-B of the straight-surface inlet shown in FIG. 1-A illustrates the standard design concept of shock focusing at the cowl lip region 240. The solution characteristic mesh illustrates the initial shock 200, the secondary shock 210 and the terminal shock 220 and visually demonstrates the compression of the supersonic flow prior to the terminal shock 220. As understood by those of skill in the art, the shock focusing may be designed with some margin built in by focusing the shocks some short distance before the cowl lip to accommodate shock position fluctuations resulting from variations in vehicle speed and atmospheric and air flow anomalies.

FIG. 2-A shows a cross-section of a relaxed compression or modified isentropic external compression inlet 300 in accordance with an embodiment of the invention. The inlet 300 includes a compression surface 310 having an initial straight surface 340 configured at an initial turn angle 310a. The compression surface 310 also includes a second compression surface 311 that includes a curved section 312 followed by a straight section 313. Although only the curved section 312 of the second compression surface 311 generates isentropic compression, the entire compression surface 310 may be referred to herein as a relaxed isentropic compression surface. For comparison, an example of a traditional isentropic compression surface 500 is shown in a dashed line. The inlet 300 includes a cowl lip 320 which is positioned at a cowl angle of 310b measured off the centerline of the inlet 300. The compression surface 310 transitions into the shoulder 330 which defines the throat 335, the narrowest portion of the inlet 300 flow path. After the throat 335, a subsonic diffuser 350 provides a divergent flow path delivering subsonic flow to the engine (not shown in FIG. 2-A). As with the inlet shown in FIG. 1-A, the inlet 300 encounters free-stream supersonic flow in the direction indicated by the arrow A and captures air flow shown in the region B. While an initial shock 400 forms when the supersonic flow initially encounters the compression surface 310, it should be noted that the compression surface 310 does not generate the secondary shock shown in FIG. 1-A. A terminal shock 410 forms at the transition between the compression surface 310 and the shoulder 330. A cowl shock 420 is shown extending upward off the cowl lip 320. As shown in FIG. 2-A, the initial shock 400 and the terminal shock 410 are focused at the shock focus point 430.

Using conventional design practice and analytical tools such as MOC and CFD, a traditional isentropic compression surface 500, shown in a dashed line on FIG. 2-A (the terminal shock associated with the traditional isentropic compression surface 500 is not shown in FIG. 2-A), may be generated for a given inlet type and design conditions. FIG. 2-B shows an inviscid flow solution for the traditional isentropic compression surface 500 in FIG. 2-A. In accordance with traditional isentropic design practice, the initial shock 510 and the terminal shock 520 are focused at the region of the cowl lip 320, forming a focus point 530. Additionally, the traditional isentropic compression surface 500 includes an initial straight surface 540 followed by a curved section 550, which may be configured to generate isentropic compression of the supersonic flow. The curved section 550 may be followed by another straight section 560. As understood by those of skill in the art and as illustrated by the inviscid flow solution in FIG. 2-B, a traditional isentropic compression surface 500 is characterized by focusing the Mach lines radiating from the curved section 550 at the focus point 530. As shown in FIG. 2-B, Mach lines generated by the curved section 550 illustrate isentropic compression as the Mach lines coalesce along their length, eventually focusing at the focus point 530.

Using the traditional isentropic compression surface as a baseline, analytical tools, such as MOC and CFD, may be used to define a relaxed isentropic compression geometry with an average level of compression less than the traditional isentropic compression surface. Boundary conditions, such as level of compression, local Mach number (for example, overwing Mach number), terminal shock Mach number, initial conic or turning angle, and others known in the art, may be used by the analytical tools to identify the surface geometry that achieves the boundary conditions. Iterative changes to the boundary conditions may be used to modify the geometry of the compression surface 310 in a controlled and predictable manner, providing an approach for arriving at a desirable design target (for example optimizing the compression surface of a relaxed isentropic inlet for a particular engine).

As used herein, compression references the difference in Mach number between a location immediately aft of the initial shock 400 and the Mach number averaged along the terminal shock 410. The level of compression of a relaxed isentropic compression surface references the difference between the compression of a traditional isentropic compression surface and the compression of a relaxed isentropic compression surface, when both surfaces are designed to the same design conditions. As would be understood by those of skill in the art, analytical tools may be configured to use various input values (for example, the average terminal shock Mach number, level of isentropic compression, etc.) to bias the compression surface 310. As an example, the compression surface 310 may be biased in order to control the target Mach number at the base 410a of the terminal shock 410.

Other methods or approaches may also be applied to generate isentropic compression geometry 310. For instance, the surface shaping could be produced based on alternate design metrics other than the level of compression. Alternate metrics may include, but should not be limited to, flow angle distribution along the length of the terminal shock or average flow distortion.

FIG. 2-C shows an inviscid flow solution for the embodiment of the relaxed isentropic compression inlet design shown in FIG. 2-A. As shown, the initial shock 400 and the terminal shock 410 converge at the region of the cowl lip 320. Contrary to the Mach lines shown in FIGS. 1-B and 2-B, the plotted Mach mesh solution of FIG. 2-C illustrates how the series of Mach lines radiating from the curved section 312 do not focus at the focus point 430. Instead, the Mach lines in FIG. 2-C include a relaxed region of compression, shown in region 450 of FIG. 2-C, that is directed into the inlet opening or away from the cowl lip 320. Rather than focusing entirely on the focus point 430, as shown in FIG. 2-B, the Mach lines in region 450 spread toward the compression surface 310 and intersect the region 450 of the terminal shock. As would be apparent to one of ordinary skill in the art, the diffused nature, or lack of focus on the focus point 430, of the Mach lines indicates that some of the traditional flow compression in the vicinity of the cowl lip, as shown in FIG. 2-B is now spreading inward, towards the compression surface 310, instead of being constrained to the vicinity of the focus point 430 in front of the cowl lip 320.

As a result, the upper (or outer annular region of an axisymmetric inlet) region of the captured flow area, in the region 450, experiences defocused or relaxed compression, and, as a consequence, experiences less local flow turning at the cowl lip. The less local flow turning in the region of the cowl lip 320 results in a lower cowl lip angle 310b, as shown in FIG. 2-A, when the cowl lip is aligned with the local flow at the cowl. As described in greater detail below, a lower cowl lip angle, in accordance with embodiments of the invention, may be used to reduce cowl drag.

As shown in FIGS. 2-A and 2-C, the terminal shock 410, at its base 410a, is substantially orthogonal to the compression surface but, thereafter, exhibits bending or curvature as the terminal shock approaches the cowl lip region. The observed bowing or curvature is driven by a velocity gradient along the length of the terminal shock. The velocity gradient of the terminal shock spans a larger Mach range from compression surface to cowl lip than the velocity gradient of the terminal shock 410 shown in FIGS. 1-A and 1-B or the terminal shock shown in FIG. 2-B. The level of terminal shock bowing, in FIG. 2-A, in the vicinity of the cowl lip 320 is representative of the local flow angle in the vicinity of the cowl lip. As the bowing becomes more pronounced due to decreased local compression 440 resulting from relaxed isentropic compression geometry 310, the local flow angle aligns itself more closely to the freestream flow direction. This is seen in the curvature of the region 450 as the terminal shock approaches the focus point 430. Because the cowling is also aligned to the local flow angle at the cowl lip 320, the cowl angle 310b is reduced.

In accordance with embodiments of the invention, the compression surface 310 uses a relaxed isentropic compression surface with a compression process distributed more prominently towards the base 410a of the terminal shock 410. While the compression surface 310 generates less compression than the traditional isentropic compression surface 500, the compression surface 310 may be configured to retain, at the base of the terminal shock, a target terminal shock Mach number similar to that of a traditional isentropic compression solution for an inlet designed to the same key inlet design parameters. By retaining a similar terminal shock Mach number at the base 410a, the relaxed isentropic compression inlet may be configured to avoid introducing a severe shock-boundary layer interaction.

The terminal shock Mach number at the base of the terminal shock may be maintained using an relaxed isentropic compression surface, although a loss of total pressure recovery may be observed due to the flow compression spreading inward and aft of the terminal shock in the region 450 near the cowl lip 320. As understood in the art, a loss of total pressure recovery may result in a reduction in engine performance. As shown in detail below, the reduction in cowl drag, as a result of a reduced cowl lip angle, offsets the reduction in engine performance resulting from the observed loss in total pressure recovery. Further, the mechanical simplicity of the inlet design shown in FIG. 1-A may be retained in relaxed isentropic compression inlet designs in accordance with embodiments of the invention.

It should be noted that the compression surface 310 shown in FIG. 2-A may be considered a hybrid design. The relaxed isentropic compression inlet design, in accordance with embodiments of the invention, includes an initial straight-surface 340 at the leading edge of the compression geometry and an isentropic shaping on the second compression surface 311.

FIG. 3-A shows a cross section of an axisymmetric relaxed isentropic compression external compression inlet 600 and subsonic diffuser 620 in accordance with an embodiment of the invention demonstrating an example of poor area matching between intake and engine. Understanding of the matching characteristics between intake capture area and maximum nacelle area may help determine the magnitude of the installed drag benefit that can be realized using relaxed isentropic compression. For example, an intake area 601, as shown in FIG. 3-A, that is small compared to the maximum nacelle area 602 results in a geometric cowl profile that may not benefit as significantly from a reduction in cowling angle at the inlet lip 610. Poor area matching results in a large cowl frontal area, defined as the difference in maximum nacelle area 602 and intake area 601. As frontal area grows, the nacelle loft lines 630 become more difficult to significantly influence through shaping at the cowl lip 610, reducing the drag and sonic boom improvement available through relaxed isentropic compression geometry.

Higher specific flow capability is a hallmark of modern turbo machinery design, and the greater flow demand for a given fan size permits the inlet capture diameter to grow relative to the engine diameter. This may be used in combination with embodiments of the invention to enable a more streamlined match between intake area at the inlet and the maximum nacelle area as shown in FIG. 3-B.

FIG. 3-B shows a cross section of an axisymmetric relaxed isentropic compression external compression inlet 700 and subsonic diffuser 720 in accordance with an embodiment of the invention demonstrating an example of good matching between intake and engine. As shown in FIG. 3-B, for example, an intake area 701 approaches the maximum nacelle area 702 resulting in a geometric cowl profile that may significantly benefit from a reduction in cowling angle at the inlet lip 710. For inlet geometry 700 that is well matched between intake diameter 701 and maximum nacelle diameter 702, reductions in cowling angle can produce a more streamlined lofting that extends further aft along the nacelle and which can produce more significant improvements in drag and sonic boom characteristics compared to those resulting from an inlet having poor area matching. As such, intake-to-engine area matching may be tailored to fully capture the drag and sonic boom benefits of the relaxed isentropic compression inlet design.

As discussed above, the performance benefits enabled by reduction in cowl lip angle may be offset elsewhere in the inlet design. Relative to a conventional inlet, for example inlet 100 of FIG. 1-A, an relaxed isentropic compression inlet, designed to the same operating conditions, may experience increased flow distortion and additional boundary layer thickness within the subsonic diffuser. For some relaxed isentropic compression inlet configurations, a reduction in total pressure recovery is also witnessed due to higher supersonic Mach number along the outer length of the terminal shock.

Further, the strong velocity gradient produced by relaxed isentropic compression along the length of the terminal shock, particularly as the cowl lip is approached, creates a less uniform post-shock velocity and pressure field within the diffuser. The less uniform post-shock velocity and pressure field may be seen by the engine as an increase in distortion. As understood by those in the art, the additional distortion may be tolerated by the turbo machinery provided that much of the flow defect passes through the fan, avoiding entrainment by the more sensitive compressor. As would be apparent, this may be achieved using higher bypass engines or engines that divert a higher ratio of flow around, as opposed to through, the compressor. However, it should be understood that other engine configurations are contemplated and may be used with inlets in accordance with the invention.

Additionally, it should be understood that the boundary layer behind the base of the terminal shock may increase as a result of the inner surface geometry changes required to smoothly decelerate the captured flow into the engine face. As the cowl lip angle is reduced, the diffuser surface angle may also be reduced immediately behind the base of the terminal shock to maintain the diffusion area profile. As a result, a more pronounced turn-angle may be introduced immediately aft of the base of the terminal shock on the diffuser shoulder instead of a more smoothly transitioning surface into the subsonic diffuser. This angle-break or large turn-angle amplifies post-shock flow reacceleration near the shoulder's peak and increases the downstream boundary layer thickness.

In determining the effectiveness of various embodiments of the invention, a cost function based on specific fuel consumption (SFC) was chosen for comparing the relative benefits of the relaxed isentropic compression inlet concept against those of conventional straight-surface configurations. The initial analysis relied on inviscid flow analysis to populate the cost function for embodiments of the relaxed isentropic compression inlet. Additionally, some embodiments and/or key results of the relaxed isentropic compression inlet design were assessed using Overflow, a higher fidelity, three-dimensional, viscous computational fluid dynamics (CFD) software package developed by NASA.

The inviscid inlet compression analysis was conducted using method-of-characteristics based analytical tools. A MOC program may be configured to operate in a design mode option in which the characteristics of a compression surface, for example, local freestream Mach number, terminal shock Mach number, surface angles, and shock-off-lip margin, are input. The MOC program may then be configured to generate the compression surface geometry and cowl lip coordinates required to meet the prescribed boundary conditions. Once a surface has been defined, the geometry definition may then be employed within the MOC code in a direct analysis mode, in which the prescribed geometry may be evaluated at off-design conditions or in combination with a nacelle outer wall geometry definition.

It should be understood that the MOC code is capable of running both two dimensional and axisymmetric inlet arrangements using single straight-surface, multi-straight surface, or relaxed or traditional isentropic compression surfaces. User-defined surface Mach number distributions may also be input as boundary conditions to define a custom surface. Note that terminal shock Mach number cannot be specified for straight inlet compression surface arrangements, as it is a fall-out of a given configuration. However, for isentropic surfaces, terminal Mach number is a required input in order to provide MOC with an objective target for the completion of the isentropic flow turning process along the compression surface.

In addition to geometric surface definition and cowl lip location, key output parameters from the MOC code include shock train total pressure recovery, additive (spillage-related) drag coefficient, cowl shock wave drag coefficient, and flow distortion. Also computed is a spatial definition of the terminal shock geometry, including local pre-shock and post-shock Mach number and flow angle along the length of the shock. Local Mach number and coefficient of pressure data are also computed along the compression surface from freestream to the base of the terminal shock. As with FIGS. 1-B, 2-B and 2-C, the MOC solution mesh can be graphically plotted in order to visualize the arrangement of shock waves and Mach lines.

The CFD analysis was performed using NASA's Overflow, a finite-difference, Reynolds-averaged computer code available to the public and used to model the flowfield within and about the inlet-nacelle-diffuser configuration. The code uses a time-dependent integration from an initial condition, usually freestream, which then converges to a steady-state solution. The computer code employs structured overset griding as well as inviscid and viscous modeling options. Post-processing calculations were used to identify key parameters such as subsonic diffuser pressure recovery, additive drag, cowl drag, flow distortion descriptors, tip and hub flow blockage, and installed SFC.

The SFC-based cost equation used for the analysis process follows the typical format for an installed powerplant arrangement with additive drag and cowl drag subtracted from net thrust within the equation. The formula references a baseline (straight-surface) inlet configuration. The equation follows:

$$\Delta SFC_{Installed} = \frac{WFE_{Base} + (\varepsilon - \varepsilon_{Base})\frac{\delta WFE}{\delta \varepsilon}}{FN_{Base} - D_{Add} - D_{Cowl}} - SFC_{Installed_{Base}}$$

The equation variables are defined as:
$\varepsilon$ inlet total pressure recovery
DAdd additive drag, lbf
DCowl cowl drag, lbf
FN net thrust, lbf
SFC specific fuel consumption, lbm/hr/lbf
WFE engine fuel flow, lbm/hr It should be understood that the departure in total pressure recovery relative to baseline is accommodated through an engine cycle-based derivative that describes the change in fuel flow at constant thrust and constant physical engine airflow. This derivative was linearized at supersonic design cruise speed using a three-point recovery survey for the applied study engine. The outer surface of the nozzle was modeled as a straight conic surface, but its associated drag was not included in the cowl drag term.

All analysis was performed assuming steady-state conditions using fixed-geometry, axisymmetric, fully external compression and a design speed of Mach 1.9, corresponding to the assumed local Mach number at a freestream aircraft cruise speed of Mach 1.8. A constant terminal shock Mach number of 1.3, measured at base of shock, was chosen to balance performance and flow stability issues. As known in the art, the initial conic shock originating from the compression surface spike tip was placed close to the cowl lip at design speed for low flow spillage.

In analyzing the straight compression surface using the initial MOC-based analysis, a wide variety of configurations were considered. Uniconic (single straight) surface designs having initial conic half-angles from 8 deg to 34 deg, measured relative to centerline, were evaluated in increments of 2 deg. Biconic (two straight) surface designs were also evaluated and included all surface combinations of initial conic half-angles from 8 deg to 34 deg (in 2 deg. increments) and second surface turn-angle from 2 deg to 16 deg (in 2 deg. increments). Shock detachment limited the maximum level of total turning angle that could be analyzed.

A naming convention is used to describe each configuration's compression surface geometry. For the straight-surface family, a four digit nomenclature was employed, the first two digits referring to the inlet's initial conic half-angle, the second two digits representing the additional turn-angle provided by the second surface. For example, 1016 Biconic is a straight-surface inlet configuration with 10 deg of initial half-angle for the initial compression surface followed by 16 deg of additional turning on the second conic surface.

FIG. 4-A shows a centerline cross section of a conventional biconic axisymmetric external compression inlet 800 designed for Mach 1.9 local flow speed. The biconic straight-surface inlet 800 was used as a baseline reference inlet, for purposes of analysis, and employed an 18 degrees of half-angle 801*a* turning on the initial cone compression surface 801 and an additional 8 degrees of turning 802*a* on the second compression surface 802. The baseline inlet 800 also includes a centerbody shoulder reverse angle 803 of 3.1 degrees. Shoulder reverse angle refers to the angle between the aft end of the compression surface relative to the surface immediately downstream at the point where the flow path transitions into the subsonic diffuser. The magnitude of the shoulder reverse angle is determined by several design variables including the diffusion profile required by the applied engine cycle and the magnitude of the cowl angle. For example, at constant terminal shock Mach number, a smaller cowl angle requires a larger reverse angle to maintain the same subsonic diffusion profile. If the reverse angle was not increased as cowl angle was decreased, a significant contraction of the downstream subsonic flow path could otherwise occur, in contradiction to the design requirements of an external compression inlet.

The inlet 800 generates a local flow angle at the cowl lip 804 of 14.1 degrees with an outer cowl lip angle 804*a* of 19.5 degrees. The angle of the surface on the inside of the cowling at the lip is aligned with the local flow angle at the terminal shock. As explained earlier, this design practice prevents the formation of complex shocks or adverse flow conditions at the cowl lip. Therefore, the local flow angle at the cowl lip, defined earlier, determines the initial angle along the inside surface of the cowling. By necessity, the outer cowl angle will be larger than the angle on the inside cowl surface in order to provide wall volume for structural and manufacturing considerations and to permit a smooth transition of the lofting from the cowl lip aft to the maximum nacelle diameter. For this inlet example, an outer cowl angle of 19.5 degrees was selected to meet these design requirements. This configuration, given the designation 1808 Biconic in accordance with the naming convention, is known in the art to provide reasonable total pressure recovery and terminal shock Mach number, as shown in the analysis below.

For the relaxed isentropic compression surfaces in accordance with embodiments of the invention, initial conic half-angles from 7 deg to 26 deg were studied at increments no greater than 2 deg. Isentropic compression values ranging from 20 percent to 100 percent, in increments no larger than 10 percent, were evaluated at each initial conic half-angle increment. Note that 100 percent compression represents a traditionally designed isentropic surface (non-hybrid) while 0 percent represents a straight surface, where none of the compression aft of the initial straight surface is attributable to isentropic compression.

A naming convention is also used for the relaxed isentropic compression family. A four digit naming convention identifies the characteristics of the relaxed isentropic compression inlet with the first two digits again referring to initial conic half-angle. The second two digits, however, represent the level of isentropic compression in percent. For example, 1280 Isentropic would be an relaxed isentropic compression inlet configuration with 12 deg of initial conic half-angle for the initial compression surface followed by an isentropic compression surface producing 80 percent of full isentropic compression.

FIG. 4-B shows a centerline cross section of an isentropic axisymmetric external compression inlet 900 designed for Mach 1.9 local flow speed in accordance with an embodiment of the invention. The relaxed isentropic compression inlet 900 employed 8 degrees of half-angle turning 901*a* on the initial cone or compression surface 901. The relaxed isentropic compression surface 902 generates a 90 percent level of compression. The relaxed isentropic compression inlet 900 also includes a centerbody shoulder reverse angle 903 of 11.5 degrees. The inlet 900 generates a local flow angle at the cowl lip 904 of 3.2 degrees with an outer cowl lip angle 904*a* of 12.0 degrees. This inlet configuration, given the designation 0890 Isentropic in accordance with the naming convention, is a relaxed isentropic compression inlet in accordance with an embodiment of the invention that shows improvement in integrated airframe performance and sonic boom assessment.

Both biconic and relaxed isentropic compression configurations employ a small amount of bluntness at the cowl lip to avoid an impractical and impossibly sharp leading edge geometry. In addition, the subsonic diffuser flowpath was designed to slightly contract for a brief longitudinal distance immediately aft of the base of the terminal shock. Slight initial contraction reduces the need for an immediate step-change in the shoulder turn angle that would otherwise be employed to rapidly introduce the required subsonic diffusion area profile. By reducing the magnitude of the turn angle, the tendency is minimized for the flow to reaccelerate at the base of the terminal shock at off-design, supercritical flow conditions, improving total pressure recovery and downstream boundary layer health. It is known to those skilled in the art that initial flow path contraction on external compression inlets can be employed without detrimental impact to the overall performance of the inlet at on-design conditions provided that care is used in its application.

An analytical turbofan engine cycle computer model was used for the analysis presented herein. This cycle is representative of engines such as the General Electric F404 turbofan and the Rolls-Royce Tay 650 turbofan. The analytical engine consisted of a two spool high-bypass ratio cycle with variable area nozzle. Operating temperature characteristics were based on a hot section life requirement of 2000 hr at supersonic cruise. The engine configuration was sized for the thrust requirements consistent with a 100,000 lb gross takeoff weight-class vehicle employing a twin-engine arrangement. The fan was sized to meet required takeoff thrust at a mean jet velocity capable of achieving Stage IV airport noise requirements with 10 dB cumulative margin. It should be understood that embodiments of the invention may be employed on various engines and adjusted to optimize performance for a given set of engine flow characteristics.

The inlet and nacelle configurations used in the present study were sized based on the cruise airflow characteristics of this engine cycle operating at maximum continuous power. The engine study cycle's relatively constant corrected airflow schedule as a function of Mach number eliminated the need for a variable inlet throat area control system, permitting the employment of a fixed inlet centerbody geometry arrangement. Applying representative levels of aircraft bleed air extraction and horsepower offtake, the engine cycle model provided net thrust, fuel flow, and pressure recovery sensitivity information which, in conjunction with the SFC-based cost function, was used to evaluate the inlet design.

FIGS. 5 through 7 show results from the MOC-based analysis in which contour plots are overlaid on the inlet design space to convey key results. The plots of the straight-surface inlet designs are shown in FIGS. 5-A, 6-A, and 7-A, which include the initial conic half-angle plotted on the horizontal axis and the second-surface turn angle plotted on the vertical axis. The plots of the isentropic inlet designs in accordance with embodiments of the invention are shown in FIGS. 5-B, 6-B, and 7-B, which include the level of compression in percent plotted on the vertical axis with the initial conic half-angle plotted on the horizontal axis.

As would be apparent to those of skill in the art, terminal shock Mach number varies as a function of the total flow turn-angle produced by the inlet compression surface. For an axisymmetric external compression inlet designed to a local freestream value of Mach 1.9, a total half-plane turn-angle of 26 deg provides a terminal shock Mach number of approximately 1.3, the value used as a design target for the analysis herein and representative of good design practice for ensuring adequate shock and flow stability. As such, it is only at 26 deg of total turning, represented in FIGS. 5-A, 6-A, and 7-A as a dashed line through the conventional straight-surface design space, that objective comparisons can be made with the isentropic results, all of which also were generated using a target terminal shock Mach number of 1.3.

FIG. 5-A shows inviscid total pressure recovery results at Mach 1.9 local flow speed for various conventional biconic inlet configurations and FIG. 5-B shows inviscid total pressure recovery results at Mach 1.9 local flow speed for various isentropic inlet configurations in accordance with embodiments of the invention. Pressure recovery is seen to generally increase as turning angle increases. An increase in turning angle produces an increase in overall upstream flow compression and, therefore, a reduction in the strength of the terminal shock. This decrease in shock strength produces a corresponding decrease in pressure loss across the terminal shock. In FIG. 5-A, it should be noted that recovery performance is maximized along the line of constant 26 deg flow turning as it nears the 0.96 total pressure recovery contour and occurs at about 18 degrees initial conic half-angle and 8 degrees second surface turn-angle or at the 1808 Biconic design point. In FIG. 5-B, pressure recovery also improves with level of compression. The 0890 Isentropic design point, as indicated on the figure, shows similar recovery pressure to 1808 Biconic. However, it should be noted that the 0890 Isentropic purposely misses peak recovery potential for trade reasons that are indicated below.

FIG. 6-A shows cowl drag coefficient results at Mach 1.9 local flow speed for various conventional biconic inlet configurations and FIG. 6-B shows cowl drag coefficient results at Mach 1.9 local flow speed for various isentropic inlet configurations in accordance with embodiments of the invention. Straight-surface drag values are nearly constant at equivalent total turn-angle because cowl angle varies little at a constant terminal shock Mach number. As would be apparent to those of skill in the art, the cowl angle and total drag increase as total turn angle increases.

As confirmed in FIG. 6-B, cowl drag decreases at fixed initial half-angle with decreasing compression level because decreasing compression implies a simultaneous reduction in cowling angle. Limitations in intake-nacelle area matching for the engine cycle employed force a local cowl drag minima region to form at lower initial conic half angles. In additional, larger initial conic half angles limit the amount of compression required of the isentropic surface, reducing its effectiveness in lowering cowl angle and, therefore, drag. Nevertheless, it should be noted that the 0890 Isentropic exhibits a much-improved cowl drag characteristic when compared to the 1808 Biconic. As discussed above, this improvement may be attributed to the reduction in cowl angle as a result of less local flow turning at the cowl lip for the relaxed isentropic compression inlet designs. For analysis purposes, the inlet drag coefficient data are normalized using the cowl area for all isolated inlet results.

FIG. 7-A shows specific fuel consumption results at Mach 1.9 local flow speed for various conventional biconic inlet configurations and FIG. 7-B shows specific fuel consumption results at Mach 1.9 local flow speed for various isentropic inlet configurations in accordance with embodiments of the invention. FIGS. 7-A and 7-B contrast installed SFC between the straight-surface inlet design and embodiments of the relaxed isentropic compression inlet design, with the results presented in terms of percent change from the value computed for the baseline 1808 Biconic inlet. Therefore, a negative value represents improvement in SFC relative to the reference point.

As indicated by the results in FIG. 7-A along the dashed line representing constant total flow turn angle of 26 deg (constant terminal shock Mach number of 1.3), no improvement in SFC is seen relative to the 1808 Biconic baseline point. This result is expected since no significant improvements in cowl drag or total pressure recovery are possible along this line of constant turn angle as discussed previously. In fact, as shown in the figure, the 1808 Biconic baseline point achieves the best SFC along the 26 deg line of constant turn-angle line. Larger turn angles (lower terminal shock Mach number) provide improved pressure recovery, but this benefit is increasingly offset by additional cowl drag resulting from the higher cowling angles. The net result is higher SFC relative to the baseline point. Conversely, lesser turn angles result in limited improvement in SFC relative to the baseline point, but these results are irrelevant because the terminal shock Mach number resulting from the lower turn angles is greater than that dictated by common supersonic design practice.

As shown in FIG. 7-B, nearly all of the isentropic inlet design space shows improvement in SFC relative to the 1808 Biconic baseline point. In the isentropic design space, the cowl drag reduction (FIG. 6-B) produced by isentropic compression levels less than 100 percent trades favorably against reduced total pressure recovery (FIG. 5-B) within the SFC-based cost equation. As shown in FIG. 7-B, the estimated installed SFC improvements of the relaxed isentropic compression inlet design 0890 Isentropic is greater than 8 percent relative to the 1808 Biconic. These results indicated that additional SFC improvement would be possible with a combination of even lower compression levels and higher initial conic half-angles, but subsequent CFD analysis showed that viscous effects precluded significant improvement relative to the 0890 Isentropic configuration in this region of the design space, as discussed further below.

Relaxed isentropic compression inlet embodiments of the invention, including the 0890 Isentropic, were analyzed using higher fidelity CFD viscous analysis tools. The configurations were chosen to cover a full range of design parameters (initial half-angle and level of compression), operating characteristics (flow distortion and blockage), and installed performance. Two straight-surface inlet design configurations were selected along the 26 deg flow turning line for CFD viscous analysis: the baseline 1808 Biconic inlet and the 2600 Uniconic inlet. It should be noted that the 2600 Uniconic is similar to the inlet design of the B-58 bomber, which was capable of Mach 2 flight speed.

FIG. 8-A shows a half-plane computational fluid dynamics (CFD) based Mach number solution at Mach 1.9 local flow speed for an 1808 Biconic inlet configuration with a fan face located at 850. FIG. 8-B shows a half-plane CFD based Mach number solution at Mach 1.9 local flow speed for an 0890 Isentropic inlet configuration with a fan face located at 860 in accordance with an embodiment of the invention. The CFD analysis was performed at on-design cruise speed and near-critical airflow. In FIG. 8-A, the 1808 Biconic solution displays well defined shock structure and a strong cowl shock.

In FIG. 8-B, the 0890 Isentropic inlet shows evidence of compression region defocusing behind the initial conic shock. This compression defocusing is an artifact of the relaxed isentropic compression process and is discussed earlier. A weaker cowl shock resulting from a decreased cowl angle is also evident, as shown in FIG. 4-B. The boundary layer thickness along the centerbody of the 1808 Bionic's diffuser in FIG. 8-A appears to be less than the boundary layer thickness along the centerbody of the 0890 Isentropic diffuser in FIG. 8-B, indicating the adverse influence of the additional turning angle at the centerbody shoulder for the relaxed isentropic compression inlet.

FIG. 9-A shows a chart of half-plane CFD based Mach number solutions at various mass flow ratios (MFR, defined as the ratio of the mass flow captured by the inlet to the flow passing through the cowl lip area projected to freestream) at Mach 1.9 local flow speed for a 1808 Biconic inlet configuration and FIG. 9-B shows a chart of half-plane CFD based Mach number solutions at various mass flow ratios at Mach 1.9 for an isentropic inlet configuration in accordance with an embodiment of the invention. As would be understood by those in the art, the mass flow ratio was controlled in the CFD analysis by means of mass flow plug geometry inserted in the downstream subsonic flow path.

Referring to FIG. 9-A, it should be noted that the terminal shock is pulled increasingly aft, into the diffuser, as mass flow ratio (plug area) increases. At a mass flow ratio of 0.9786, a gap can be observed between the tip of the terminal shock and the cowl lip, indicating a small amount of flow spillage (the flow is slightly subcritical). At a mass flow ratio of 0.9876, the terminal shock is now essentially attached to the cowl lip, indicating minimal spillage (the flow is near-critical). At a mass flow ratio of 0.9881, the flow is slightly supercritical with the terminal shock entrained more deeply at its base within the diffuser. At a mass flow ratio of 0.9883, the super-critical shock structure becomes more adverse, which, as would be apparent to those of skill in the art, raises the boundary layer thickness and reduces downstream flow area to a value less than that at the intake entrance. As a result of the increased boundary layer, the shock train may be expelled, with increased spillage. This expulsion of the shock train is evidenced by the final CFD solution in FIG. 9-A with an MFR of 0.9119.

Referring to FIG. 9-B, the terminal shock is pulled increasingly aft with increasing mass flow, as in FIG. 9-A. The solutions in FIG. 9-B were not carried to the point where the shock train was expelled, but they provide substantiation that the relaxed isentropic compression inlet can tolerate significant entrainment of the base of the terminal shock at super-critical flow values, like the Biconic inlet in FIG. 9-A. This is evidenced by the solutions in FIG. 9-B at MFR values of 0.9851 and 0.9860 in which the terminal shock base is very deeply angled into the subsonic diffuser flow-path. As indicated by the ability to support significant entrainment of the terminal shock within the downstream diffuser at high MFR, both the 1808 Biconic in FIG. 9-A and the 0890 Isentropic in FIG. 9-B show moderate tolerance for supercritical mass flow.

FIG. 10 shows a graph plotting CFD based mass flow ratio (y-axis) as a function of inlet mass flow plug area (x-axis) at Mach 1.9 local flow speed for four inlet configurations: 1808 Biconic, 0890 Isentropic, 0895 Isentropic, and 1470 Isentropic. Plotting MFR vs mass flow plug area can provide an indication of the flow pumping capability of each inlet and any corresponding sensitivity to the influence of diffuser boundary layer characteristics. For instance, inlets that exhibit a higher mass flow for a given plug area suggests that those configurations experience less downstream boundary layer-induced flow blockage. Also, an inlet that exhibits a downward break in mass flow ratio at a lower plug area indicates that that configuration has a diffusion profile that is more sensitive to boundary layer buildup with increasing mass flow. From FIG. 10, it can be seen that the inlets with higher compression levels pass more flow per unit plug area. This is because inlets with higher levels of compression have lower centerbody shoulder reverse angles because of the higher cowling angles. A lower centerbody shoulder reverse angle produces a more gentle downstream boundary layer and, therefore, less flow blockage.

Figure 11:
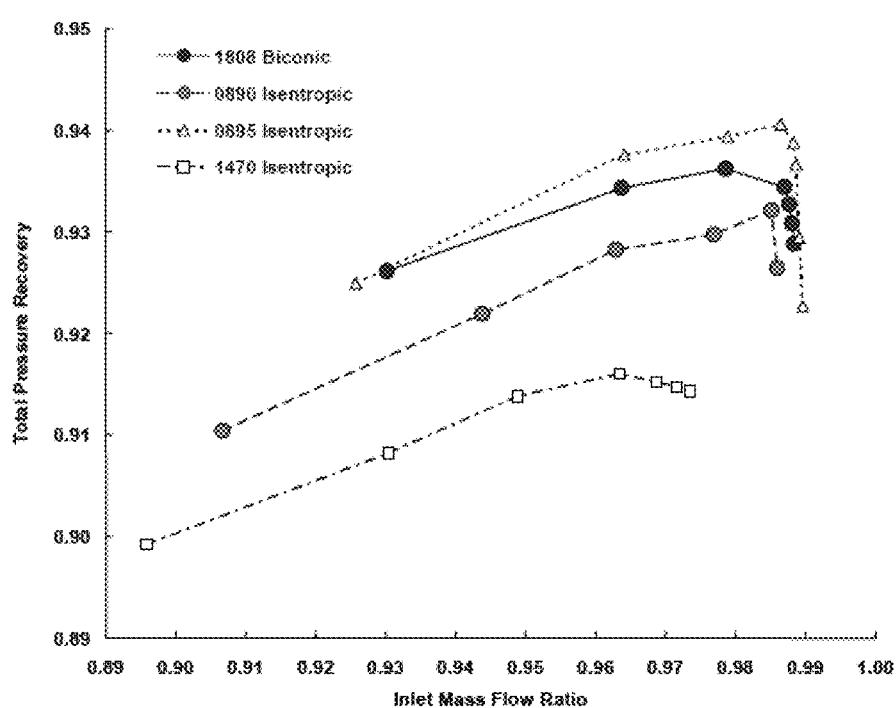
FIG. 11 shows CFD-based total pressure recovery data as a function of mass flow ratio at Mach 1.9 for various axisymmetric conventional inlets and isentropic inlets according to an embodiment of the invention.

FIG. 11 shows a graph plotting CFD based total pressure recovery (y-axis) as a function of mass flow ratio (x-axis) at Mach 1.9 local flow speed for four inlet configurations: 1808 Biconic, 0890 Isentropic, 0895 Isentropic, and 1470 Isentropic. Unlike the earlier results using MOC, these CFD based analysis includes viscous subsonic diffuser losses. The near-critical flow region for each inlet configuration is evident in FIG. 11 based on the peak recovery point and the rapid loss of recovery at higher flow values. Because of reduced terminal shock strength in the vicinity of the cowl lip, higher isentropic compression levels deliver better recovery. As noted before, the 0890 Isentropic inlet demonstrates slightly worse recovery characteristics than the 1808 Biconic.

Figure 12:
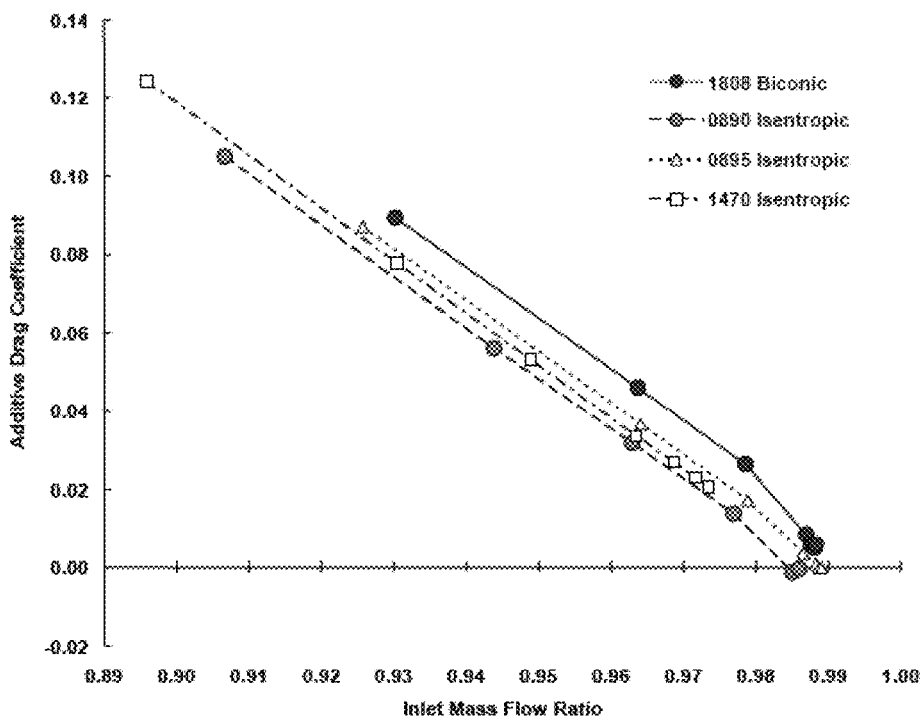
FIG. 12 shows CFD-based additive drag coefficient data as a function of mass flow ratio at Mach 1.9 for various axisymmetric conventional inlets and isentropic inlets according to 20 an embodiment of the invention.

FIG. 12 shows a graph plotting CFD based additive drag coefficient (y-axis) as a function of mass flow ratio (x-axis) at Mach 1.9 local flow speed for four inlet configurations: 1808 Biconic, 0890 Isentropic, 0895 Isentropic, and 1470 Isentropic. Additive drag is that component of inlet-generated drag resulting from excess flow spilling around the inlet. The data shown in FIG. 12 indicates that the difference in the additive drag coefficient for the plotted inlet configurations is minor and the values small for the 1808 Biconic, 0890 Isentropic, 0895 Isentropic inlets, provided that the inlets are flowing at near-critical flow. As would be apparent to those of skill in the art, additive drag coefficient increases very rapidly as flow spillage increases.

Figure 13:
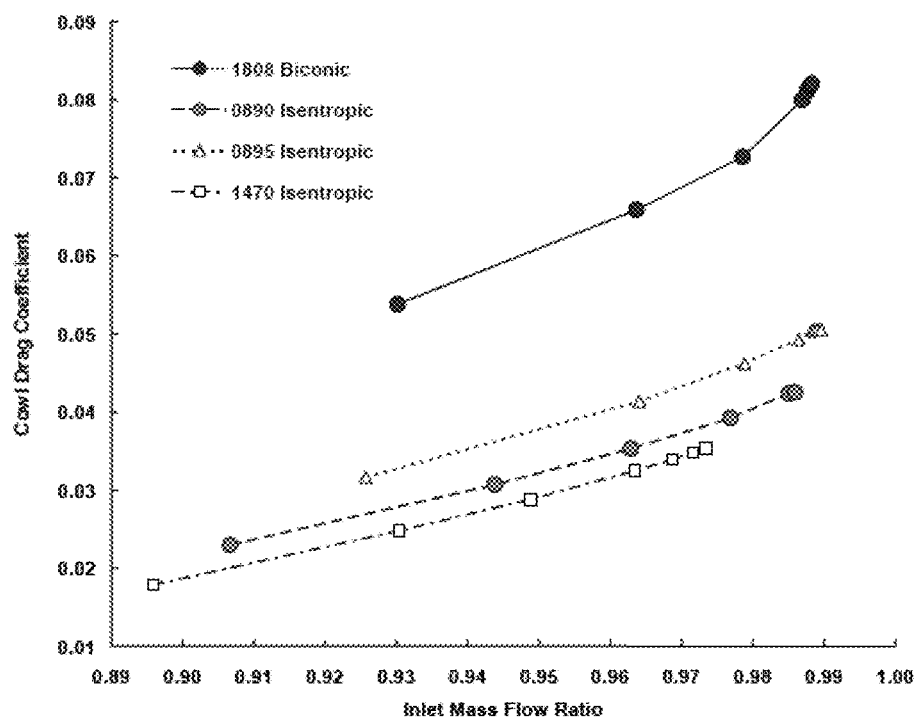
FIG. 13 shows CFD-based cowl drag coefficient data as a function of mass flow ratio at Mach 1.9 for various axisymmetric conventional inlets and isentropic inlets according to an embodiment of the invention.

FIG. 13 shows a graph plotting CFD based cowl drag coefficient (y-axis) as a function of mass flow ratio (x-axis) at Mach 1.9 local flow speed for four inlet configurations: 1808 Biconic, 0890 Isentropic, 0895 Isentropic, and 1470 Isentropic. FIG. 13, like the MOC-based results in FIG. 6, demonstrates the potential performance differences between the straight-surface inlet designs and the relaxed isentropic compression inlet designs in accordance with embodiments of the invention. As shown in FIG. 13, the cowl drag steadily increases with MFR with the lower levels of isentropic compression producing the least amount of cowl drag due to their lower cowl angles as discussed above. The conventional 1808 Biconic inlet configuration displays a significantly greater amount of cowl drag, in some cases over twice as much cowl drag, than the three Isentropic inlets shown in FIG. 13.

It should be noted that, despite the lowest cowl drag data of any configuration in FIG. 13, the 1470 Isentropic inlet was unable to achieve both low cowl drag and low spillage flow conditions. As shown in FIG. 12, the lowest attainable additive drag coefficient for the 1470 Isentropic inlet is about 0.02 due to severe subsonic diffuser boundary layer growth characteristics. As such, viscous effects prevented the 1470 Isentropic inlet from achieving a low additive drag value when compared to other relaxed isentropic compression inlet embodiments of the invention. This subsonic diffuser boundary layer growth characteristic is generally seen with all low compression relaxed isentropic compression inlets, precluding them from fully capitalizing on their otherwise low cowl drag features.

FIG. 14-A shows a graph plotting CFD based installed specific fuel consumption (y axis) as a function of mass flow ratio (x-axis) at Mach 1.9 local flow speed for four inlet configurations: 1808 Biconic, 0890 Isentropic, 0895 Isentropic, and 1470 Isentropic. The results shown in FIG. 14-A are generated using CFD based analysis and the SFC cost equation presented above. As was done for the MOC-based results, the SFC data is presented as a percentage of the baseline 1808 Biconic's value at near-critical mass flow with negative values indicating relative performance improvement. The 0890 Isentropic inlet, at near-critical flow, indicates about a 9.9 percent improvement over the baseline 1808 Biconic at near-critical flow.

FIG. 14-B shows a graph plotting CFD based installed specific fuel consumption (y axis) in percent at near-critical flow at Mach 1.9 local flow speed for two conventional inlets and eight isentropic inlets in accordance with embodiments of the invention. Although only the 1808 Biconic, 0890 Isentropic, 0895 Isentropic, and 1470 Isentropic inlets were shown in FIGS. 10 through 14-A for clarity and simplicity, CFD analysis was used to evaluate eight relaxed isentropic compression inlets: 0890 Isentropic, 0895 Isentropic, 1070 Isentropic, 1090 Isentropic, 1470 Isentropic, 1490 Isentropic, 1850 Isentropic, 1870 Isentropic. The isentropic inlets were chosen to cover a full range of design parameters (initial half-angle and level of compression), operating characteristics (flow distortion and blockage), and installed performance. Again, the SFC data is presented as a percentage of the baseline 1808 Biconic's value at near-critical mass flow with negative values indicating relative performance improvement.

Using results from the CFD analysis of the straight-surface inlets and the relaxed isentropic compression inlets, the SFC data for each inlet at near-critical flow is presented in FIG. 14-B. For those inlets capable of achieving near-critical mass flow and low additive drag (all but 1070 Isentropic, 1470 Isentropic, and 1850 Isentropic), the CFD-based results mirror the MOC-based predictions, shown in FIG. 7-B. In FIG. 7-B and FIG. 14-B, performance improvements approaching 10 percent are indicated for relaxed isentropic compression inlets employing moderately high levels of compression (greater than about 70 percent). Those configurations using less compression (about 70 percent or less) had lower performance because their high additive drag features overwhelmed the cowl drag benefit of their lower cowl lip angles.

As shown above, the on-design inlet performance characteristics of the relaxed isentropic compression inlet design showed improvement and validation using high fidelity analysis tools. To further validate the findings of the invention, the off-design characteristics at lower supersonic Mach number were also analyzed. To address off-design characteristics, the 1808 Biconic was evaluated against the 0895 Isentropic embodiment of the invention.

Figure 15:
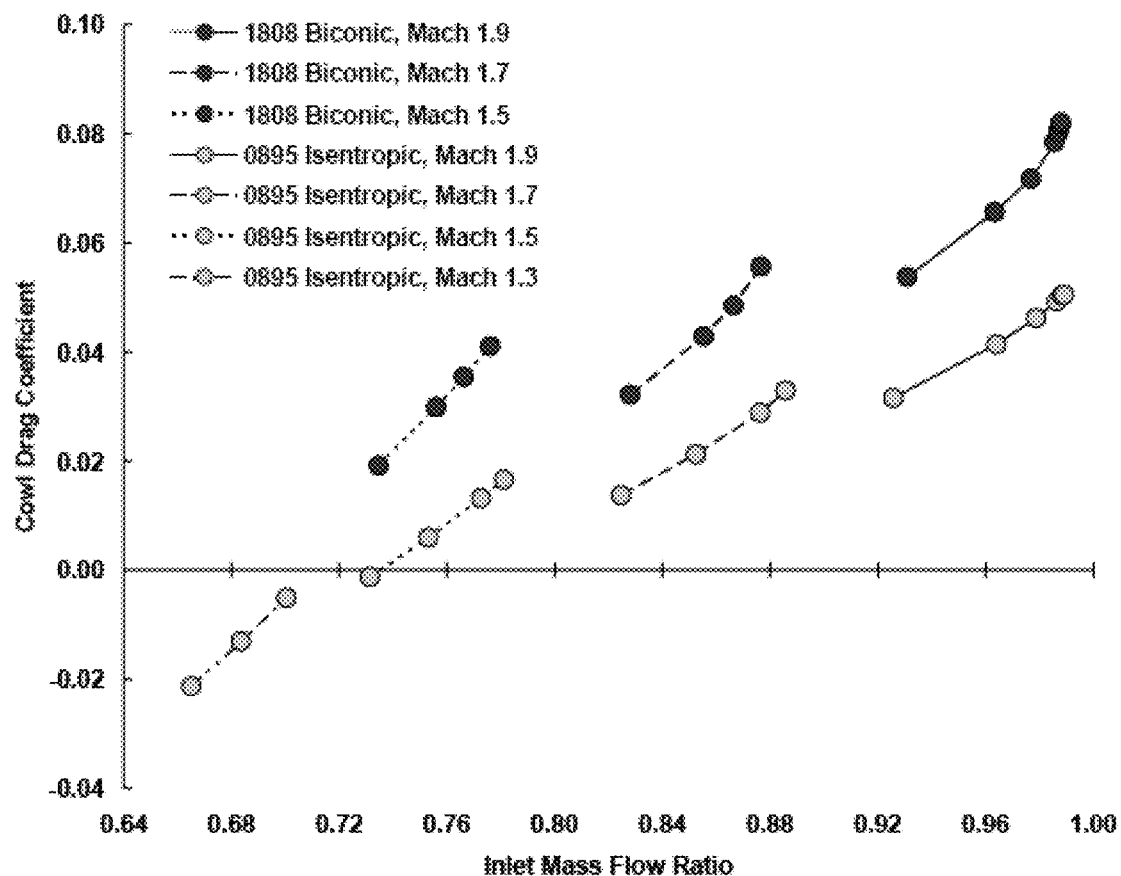
FIG. 15 shows CFD-based cowl drag coefficient as a function of mass flow ratio at on- and off-design local Mach numbers for an axisymmetric conventional inlet and an isentropic inlet according to an embodiment of the invention.

FIG. 15 shows a graph plotting CFD based cowl drag coefficient (y-axis) as a function of mass flow ratio at on- and off-design Mach numbers for the 1808 Biconic inlet and the 0895 Isentropic inlet. Cowl drag coefficient data for the 1808 Biconic are shown for local flow Mach numbers 1.9, 1.7, and 1.5. Cowl drag coefficient data for the 0895 Isentropic are shown for local flow Mach numbers 1.9, 1.7, 1.5, and 1.3. It should be noted that the 0895 Isentropic configuration maintains a cowl drag advantage over the straight-surface inlet throughout the Mach ranges and mass flow ratio ranges. Although not shown in the Figures, a modest improvement in off-design additive drag was also noted for the 0895 Isentropic over the 1808 Biconic.

Finally, an intensive, CFD-based analysis was performed on embodiments of the relaxed isentropic compression inlet design integrated with a representative supersonic study aircraft. The results were compared to a (baseline) conventional straight-surface inlet integrated with the study aircraft. The integrated inlet analysis was used to determine the effect of the relaxed isentropic compression inlet on sonic boom propagation. The sonic boom analysis was accomplished by integrating the conventional and relaxed isentropic compression inlet configurations and analyzing the results with a combination of CFD and traditional sonic boom propagation methods. For purposes of integration, vehicle drag polars and angle-of-attack characteristics were generated for the study aircraft configuration analyzed using Overflow software, a CFD analytical tool.

Approximately nine million grid points were used to model the configurations. Euler methodology was applied to the wing and fuselage surfaces whereas viscous Navier-Stokes was used to solve for the highly complex flowfield within the inlet-nacelle-pylon region. Friction increments were applied to the wing-fuselage Euler results to account for viscous effects. Overflow-based CFD results were used to capture the full three-dimensional near-field aerodynamic flowfield about the airplane and to initiate the sonic boom propagation process. Front-end vehicle shape morphing as discussed below was modeled in the retracted position to reduce the analytical overhead, which did not influence the assessment of the inlet's contribution to the sonic boom ground signature because the signature shaping provided by the front-end morphing is largely independent of, and does not alter, the wing and inlet shocks for a non-coalesced shock system. The Overflow CFD grid structure used for sonic boom near-field analysis includes an additional grid block below the airplane to obtain high flowfield resolution to a larger distance from the vehicle.

The near-field symmetry plane pressure signatures extracted from the CFD solutions were used to initiate the sonic boom propagation using the Thomas code, a NASA Ames Research Center developed algorithm for extrapolating near field pressures to determine ground-level sonic boom characteristics.

FIG. 16-A, FIG. 16-B, and FIG. 16-C show a top view, a front view, and a side view, respectively, of the study aircraft configuration used for analysis. The study aircraft is a 100,000 lb gross takeoff weight-class platform designed for a long-range cruise speed of Mach 1.8. As shown in FIGS. 16-A and 16-C, the vehicle capitalizes extensively on area-volume distribution improvements resulting from recent progress in low sonic boom morphing techniques. Avoiding the uncertainty and high development risk associated with large-scale laminar flow concepts, the configuration employs variable wing sweep (FIG. 16-A shows the wings in both the extended and swept positions) to assure good performance and handling qualities at takeoff, approach, and landing. The wing itself incorporates a subsonic leading edge and retains excellent internal volume characteristics.

As shown in FIGS. 16-A and 16-C, a morphing technology is incorporated into the forward fuselage to provide longitudinal extension for supersonic flight. This morphing technique is theoretically predicted to greatly reduce the sonic boom impulse by breaking the initial vehicle overpressure wave into a series of reduced-strength shocklets. The effective lengthening of the vehicle also assists in preventing the coalescence of the shocklets into an undesirable, high-impulse N-wave overpressure pattern. The inclusion of the morphing technology, described in U.S. Pat. No. 6,698,684 which is hereby incorporated in its entirety, enables improved fuselage area redistribution for the same peak boom overpressure target. The new area distribution provides for a cabin volume comparable to that of large-cabin corporate jets and a much-improved aft fuselage volume allowance for empennage design leeway and structural stiffening.

The study aircraft incorporates a two-engine, above-wing, podded nacelle arrangement that offers positioning latitude and acoustic benefits. The above-wing location is predicted to provide far-field sonic overpressure shielding during supersonic flight as well as reduced airport environment noise.

It should be understood that the wing shielding reduces downward propagation of a substantial portion of the shock energy produced by the inlet-nacelle at supersonic speed. But while effective in reducing sonic boom strength, the inlet shock interaction with the wing upper surface also reduces the aerodynamic performance of the wing and creates a vehicle configuration that is particularly sensitive to propulsion system integration and inlet shock strength.

Therefore, local inlets that achieve performance improvements through cowl streamlining, such as the relaxed isentropic compression inlet design of the invention, generate weaker cowl shocks that result in less contribution to overall vehicle sonic boom characteristics and an overall vehicle performance benefit in that the inlet-airframe shock interaction is reduced.

The actual level of improvements in aircraft performance and sonic boom characteristics are dependent on the actual aircraft configuration and flight characteristics. As such, the performance and sonic boom data presented below indicate a representative level of improvement that can be obtained through employing relaxed isentropic compression inlet shaping on the study aircraft only. Results are compared between two vehicle configurations, one using the conventional baseline 1808 Biconic inlet and the other employing the 0890 Isentropic inlet.

FIG. 17 shows a top view of a CFD based surface pressure solution of wing and fuselage surfaces at freestream Mach 1.8 with the conventional 1808 Biconic inlet shown on the left side of the aircraft and the 0890 Isentropic inlet shown on the right side of the aircraft. Due to the symmetry of the aircraft and the analysis, FIG. 17 is broken in half for simplicity of presentation and for direct comparison between the integration of the conventional inlet and the relaxed isentropic compression inlet. The nacelle surfaces were subsequently removed from the image shown in FIG. 17 to permit visualization of the shock-wing interaction underneath the nacelles. It should be noted that the relaxed isentropic compression inlet of the embodiments of the invention reduced the shock strength as shown in FIG. 17. The lower shock strength also results in a more favorable, aft-riding intersection line with the wing upper surface which is beneficial from the drag perspective.

An improvement in cruise drag for the study aircraft of over 7 percent was seen when employing integrated inlets using relaxed isentropic compression. These results indicate that the performance characteristics of the relaxed isentropic compression inlet design, seen during the isolated analysis effort, may be substantially retained once the nacelles are integrated with an airframe.

Figure 18:
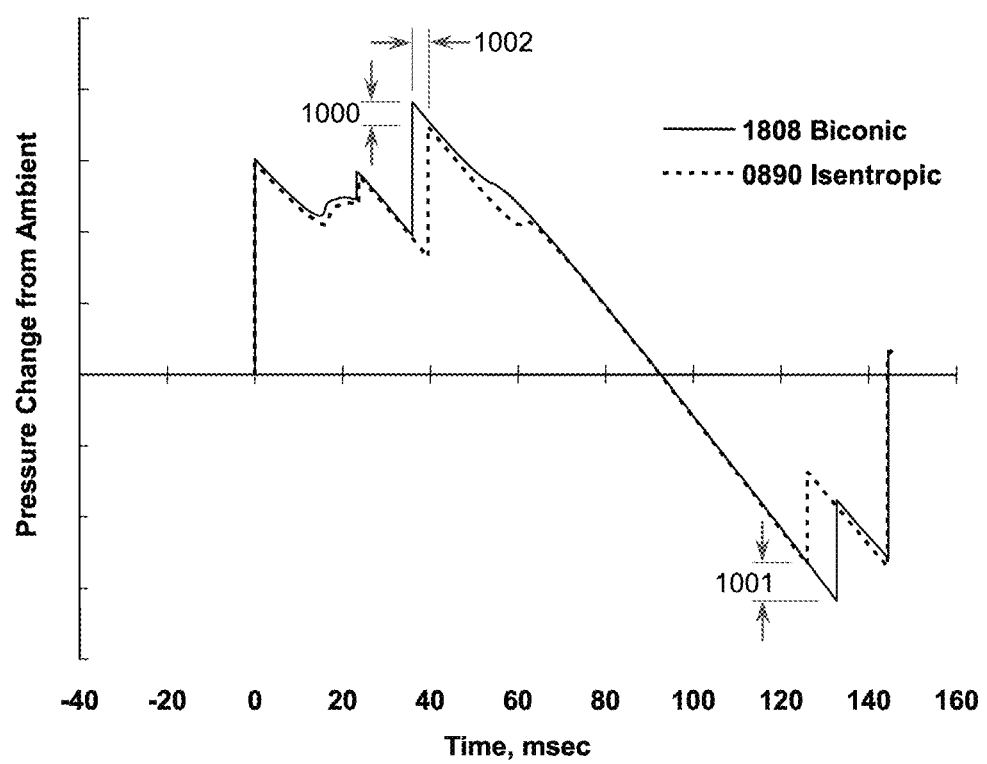
FIG. 18 shows the study aircraft sonic boom signatures at Mach 1.8 cruise speed for a conventional axisymmetric inlet on the study aircraft and an axisymmetric isentropic inlet according to an embodiment of the invention on the study aircraft.

FIG. 18 presents far-field sonic boom overpressure solutions of aircraft sonic boom signatures for both the conventional 1808 Biconic inlet on the study aircraft and the 0890 Isentropic inlet on the study aircraft. FIG. 18 plots pressure change from ambient (y-axis) against time in milliseconds (x-axis). FIG. 18 compares results for a cruise condition of 51,000 ft and Mach 1.8. As a result of its weaker shock features, peak aircraft overpressure using the 0890 Isentropic inlet has been reduced by 9 percent on the forward maxima 1000 and by nearly 16 percent on the aft maxima 1001 when compared to results using 1808 Biconic. Rise time 1002 to the first peak is also delayed by nearly 10 percent.

Although the above analysis includes the use of the aircraft configuration shown in FIGS. 16-A, 16-B, and 16-C, it would be apparent to those of skill in the art that relaxed isentropic compression inlet designs, in accordance with embodiments of the invention, may be employed on alternative aircraft configurations. Further, the location, arrangement, number, and size of relaxed compression isentropic inlet designs may be altered in accordance with the embodiments of the invention without deviating from the scope and spirit of the invention.

The relaxed isentropic compression inlet design increases the design latitude for lofting the inlet cowling region while permitting control over other key inlet design parameters such as terminal shock Mach number, diffuser flow distortion, and total pressure recovery. As shown, reduced cowling surface angles may improve inlet drag and interference drag characteristics. The reduced slope of the cowling also lowers the contribution of the inlet to the overall vehicle sonic boom characteristic during supersonic flight and decreases the potential for aerodynamic cross-interference between close-coupled inlets.

The relaxed isentropic compression inlet designs in accordance with embodiments of the invention achieve improvements over the conventional straight-surface inlet designs without the use of complicated secondary systems or variable geometry. However, it is contemplated that the invention may be combined with other systems, such as inlet bypass flow methods, bleed air-based boundary layer management systems, aerodynamically tailored centerbody support struts, surface treatment-based boundary layer management techniques and methods, or other systems and methods. Likewise, it is contemplated that inlets in accordance with embodiments of the invention may be combined with various propulsion systems including, but not limited to, gas turbine, ramjet, scramjet, or combined cycle.

Again, it should be understood that the relaxed isentropic compression design approach may be applied to any external compression or mixed compression inlet concept, including axisymmetric, partial conic, and two-dimensional intakes. In fact, cowling angles for external compression inlets can be reduced to approach those employed by traditional mixed compression inlets using the embodiments of the invention, merging the inherent shock stability robustness of external compression geometry with the high installed performance of mixed compression.

The foregoing descriptions of specific embodiments of the invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. An external compression inlet for use with a supersonic jet engine, comprising:
 a cowl having a cowl lip; and
 an external compression surface comprising, in cross section, a leading edge or point, an initial segment downstream of the leading edge or point and inclined at a constant, initial turn angle with respect to a freestream, a curved segment downstream of the initial segment, the curved segment inclined with respect to a freestream at a varying angle which increases in an aft direction, a straight segment downstream of the curved segment, and a transition from the straight segment to a shoulder;
 wherein said external compression surface is disposed such that, at a predetermined design cruising speed, a terminal shock extends from a point proximate said cowl lip to said external compression surface; and
 wherein said curved segment comprises a relaxed isentropic compression surface which differs from a conventional isentropic compression surface in that said relaxed isentropic compression surface, at said predetermined design cruising speed, is characterized by a continuum of infinitesimally weak shocklets, a plurality of which are defocused away from said cowl lip and extend along said terminal shock.

2. An external compression supersonic inlet comprising:
 a leading edge or leading point configured to generate an initial shock in a supersonic flow;
 a compression surface positioned downstream of the leading edge or leading point, the compression surface including an initial portion disposed downstream of the leading edge or point and inclined at a constant turn angle with respect to a freestream, a concave portion disposed downstream of the initial segment, the concave portion comprising a relaxed isentropic compression surface and configured to generate a plurality of Mach lines in the supersonic flow, a straight portion disposed downstream of the concave portion, and a transition from the straight portion to a shoulder; and
 a cowl lip spaced apart from the compression surface, wherein:
 the leading edge or leading point is further configured to cause the initial shock to extend to a point adjacent the cowl lip at a predetermined cruise speed,
 and the relaxed isentropic compression surface is further configured to direct the plurality of Mach lines to extend from the relaxed isentropic compression surface to a terminal shock extending from the point adjacent the cowl lip to the compression surface at a respective plurality of locations disposed radially along the terminal shock between the cowl lip and the compression surface at the predetermined cruise speed.

* * * * *